US011078221B2

(12) United States Patent
Lloyd-Evans et al.

(10) Patent No.: US 11,078,221 B2
(45) Date of Patent: Aug. 3, 2021

(54) PHOSPHORODIAMIDATES AND OTHER PHOSPHORUS DERIVATIVES OF FINGOLIMOD AND RELATED S1P RECEPTOR MODULATORS

(71) Applicant: UNIVERSITY COLLEGE CARDIFF CONSULTANTS LTD, Cardiff (GB)

(72) Inventors: Emyr Lloyd-Evans, South Glamorgan (GB); Fabrizio Pertusati, Cardiff (IT); Edward James, Derby (GB); Emily Maguire, Cardiff (GB); Christopher McGuigan, Cardiff (GB)

(73) Assignee: UNIVERSITY COLLEGE CARDIFF CONSULTANTS LTD, Cardiff (GB)

( * ) Notice: Subject to any disclaimer, the term of this patent is extended or adjusted under 35 U.S.C. 154(b) by 0 days.

(21) Appl. No.: 16/651,058

(22) PCT Filed: Sep. 28, 2018

(86) PCT No.: PCT/GB2018/052765
§ 371 (c)(1),
(2) Date: Mar. 26, 2020

(87) PCT Pub. No.: WO2019/064012
PCT Pub. Date: Apr. 4, 2019

(65) Prior Publication Data
US 2020/0255460 A1   Aug. 13, 2020

(30) Foreign Application Priority Data
Sep. 29, 2017 (GB) .................................... 1715786

(51) Int. Cl.
*C07F 9/26* (2006.01)
*C07F 9/12* (2006.01)
(Continued)

(52) U.S. Cl.
CPC ............ *C07F 9/26* (2013.01); *C07F 9/12* (2013.01); *C07F 9/2429* (2013.01); *C07F 9/2458* (2013.01); *C07F 9/5728* (2013.01)

(58) Field of Classification Search
None
See application file for complete search history.

(56) References Cited

U.S. PATENT DOCUMENTS

2006/0264403 A1* 11/2006 Albert ..................... A61P 5/14
                                                                514/80
2008/0064662 A1   3/2008 Saha et al.
(Continued)

FOREIGN PATENT DOCUMENTS

JP        2004137208      *    5/2004
WO     2002/18395 A1         3/2002
(Continued)

OTHER PUBLICATIONS

English language translation of JP2004137208 from Google Patents (Year: 2004).*
(Continued)

*Primary Examiner* — Amy C Bonaparte
(74) *Attorney, Agent, or Firm* — Patrick M. Torre; King & Schickli, PLLC

(57) ABSTRACT

Compounds of general formula (I): (Formula I)) wherein $R^1$, Q, $R^3$, $R^4$, $R^5$, $R^6$, $R^7$ and $Ar^1$ are as defined herein are inhibitors of class I histone deacetylases and are of use in the treatment of lysosomal storage disorders, especially Niemann-Pick type C disease, as well as other lysosomal storage disorders, defective autophagy, accumulation of free cholesterol and mycobacterial diseases.

(Continued)

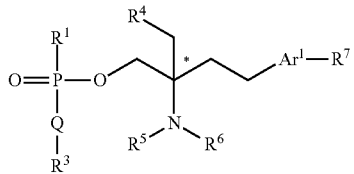

(I)

21 Claims, 8 Drawing Sheets

Figure 1:
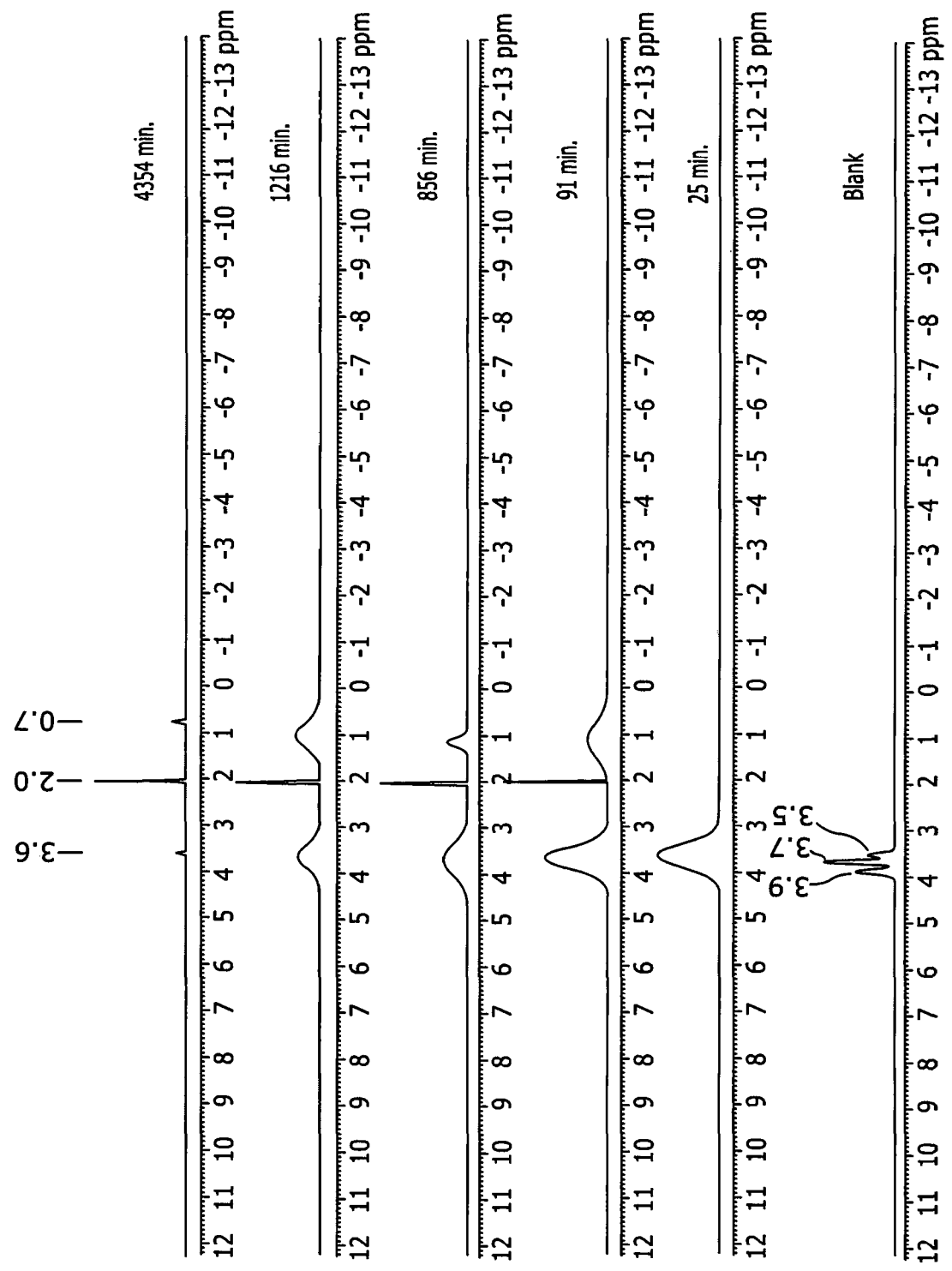

(51) Int. Cl.
*C07F 9/24* (2006.01)
*C07F 9/572* (2006.01)

(56) References Cited

U.S. PATENT DOCUMENTS

2009/0137530 A1* 5/2009 Kiuchi .................. C07C 255/54
 514/114
2009/0163523 A1* 6/2009 Lake ........................ A61P 17/02
 514/265.1

FOREIGN PATENT DOCUMENTS

| WO | 2002/076995 A | 10/2002 |
|---|---|---|
| WO | 2005/014603 A1 | 2/2005 |
| WO | 2007/069712 A1 | 5/2009 |

OTHER PUBLICATIONS

International Search Report and Written Opinion for PCT/GB2018/052765 dated Nov. 2, 2018.

Edward James, et al., Kinase-independent phosphoramidate S1P1 receptor agonist benzyl ether derivatives; Bioorganic & Medicinal Chemistry Letters, vol. 7, No. 6, Mar. 1, 2017; pp. 1371-1378.

Hans Vienken, et al., Characterization of cholesterol homeostasis in sphingosine-1-phosphate lyase-deficient fibroblasts reveals a Niemann-Pick disease type C-like phenotype with enhanced lysosomal Ca2+ storage; Scientific Reports vol. 7, No. 1, Mar. 6, 2017.

Yasuo Nagaoka, et al., Effects of Phosphorylation of Immunomodulatory Agent FTY720 (Fingolimod) on Antiproliferative Activity against Breast and Colon Cancer Cells; Biological & Pharmaceutical Bulletin, vol. 31 (6), 2008 pp. 1177-1181.

* cited by examiner

PHOSPHORODIAMIDATES AND OTHER PHOSPHORUS DERIVATIVES OF FINGOLIMOD AND RELATED S1P RECEPTOR MODULATORS

TECHNICAL FIELD

The present invention is directed to novel compounds that are useful in the treatment of Niemann-Pick diseases, particularly Niemann-Pick type C disease as well other lysosomal storage disorders, particularly sphingolipidoses; endocytic transport abnormalities, defective autophagy, accumulation of free cholesterol, elevated levels of glycosphingolipids, and mycobacterial infection, such as BCG and TB. In particular, the invention relates to phosphoramidates, phosphorodiamidates and other phosphorus derivatives of fingolimod and related S1P receptor modulators. The invention also relates to methods for preparing the compounds and to pharmaceutical compositions containing them.

BACKGROUND

Niemann-Pick diseases are a subgroup of lipid storage disorders called sphingolipidoses in which harmful quantities of fatty substances, or lipids, accumulate in the spleen, liver, lungs, bone marrow, and brain, and represent a group of severe metabolic disorders in which sphingomyelin accumulates in lysosomes in cells.

Cholesterol storage and failure in the fusion of late endosomes/lysosomes (LE/Lys) is a hallmark feature of the Type C form of the disease, Niemann-Pick type C (NPC). Niemann-Pick type C affects an estimated 1:150,000 people. Approximately 50% of cases present before 10 years of age, but manifestations may first be recognized as late as the sixth decade. Niemann-Pick type C is biochemically, genetically and clinically distinct from Niemann-Pick Types A or and B. In Types A and B, there is complete or partial deficiency of the lysosomal enzyme called acid sphingomyelinase. In Niemann-Pick type C, the protein product of the major mutated gene NPC1 is not an enzyme but appears to function as a transporter in the endosomal-lysosomal system, which moves large water-insoluble molecules through the cell.

NPC is caused by mutations in the NPC1 (95% of clinical cases) or NPC2 genes, with defects in either gene resulting in identical clinical phenotypes. NPC1 encodes NPC1, a membrane protein in the LE/Lys membrane. In contrast, NPC2 is a soluble cholesterol-binding protein of the lysosomal lumen. The clinical manifestations of Niemann-Pick types C1 and C2 are similar because the respective genes are both involved in egress of lipids, particularly cholesterol, from late endosomes or lysosomes. Affected individuals may have enlargement of the spleen (splenomegaly) and liver (hepatomegaly), or enlarged spleen or liver combined (hepatosplenomegaly). Progressive neurological disease is the hallmark of NPC, and is responsible for disability and premature death in all cases beyond early childhood. A variety of neurological signs and symptoms typically associate with the disease including cerebellar ataxia (unsteady walking with uncoordinated limb movements), dysarthria (slurred speech), dysphagia (difficulty in swallowing), psychosis, progressive dementia, progressive hearing loss, bipolar disorder, major and psychotic depression that can include hallucinations, delusions, mutism, or stupor. In the terminal stages of NPC, the patient is bedridden, with complete ophthalmoplegia, loss of volitional movement and severe dementia.

Upon the pharmacological inactivation of NPC1 the first measurable event is an increase in sphingosine levels in the LE/Lys, rapidly followed by decreased lysosomal $Ca^{2+}$ levels and subsequent attenuated $Ca^{2+}$ release from the LE/Lys. This leads to downstream endocytic trafficking defects, failure in LE/Lys fusion and the subsequent accumulation of cholesterol and glycosphingolipids (GSLs) in a distended endo-lysosomal compartment. In addition to storage of multiple lipids, NPC cells also accumulate autophagic vacuoles, due to a failure in their clearance. Accumulation of cholesterol in lysosomes leads to relative deficiency of this molecule in multiple membranes and for use in steroid synthesis There is no known cure for NPC, nor is there any FDA-standard approved disease modifying treatment.

The NPC1 protein, a putative cholesterol and sphingosine transporter, is disrupted in Niemann-Pick C1 but it appears that disruption of NPC1 is also a factor in Niemann-Pick type C2 as well as Niemann-Pick types A and B and other lysosomal storage disorders such as neuronal ceroid lipofuscinoses (NCL), lipidoses, mucolipidoses and sphingolipidoses such as, Gaucher disease, Fabry disease and Tay-Sachs disease. It has also been shown that the NPC1 protein is altered in other diseases leading to the accumulation of free cholesterol, these include conditions such as Smith-Lemli-Opitz syndrome and Huntington's where cholesterol precursors inhibit NPC1 function and in mycobacterial diseases such as tuberculosis and Bacillus Calmette-Guérin (BCG) where cell wall components of the bacteria mimic cholesterol and inhibit NPC1 function.

Fingolimod (Gilenya; FTY720) is a synthetic compound derived from an immunosuppressive natural fungal secondary metabolite, myriocin (ISP-I), and was first synthesised in 1992 by Yoshitomi Pharmaceuticals and has the structure:

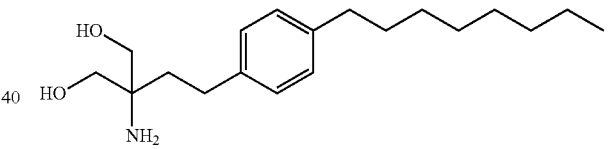

Fingolimod was the first drug to be approved for oral administration for the treatment of relapsing-remitting forms of multiple sclerosis. In particular, it has been found to reduce relapses and delay disability progression. More recently, fingolimod has been investigated to treat a wide variety of other conditions, including cancer, and has also been found to have potential in reducing the incidence of transplant rejection.

Fingolimod becomes active in vivo following phosphorylation by sphingosine kinase 2 to form fingolimod-phosphate (FTY720-P), which binds to extracellular G protein-coupled receptors, $S1P_1$, $S1P_3$, $S1P_4$ and $S1P_5$ receptors, and prevents the release of lymphocytes from lymphoid tissue.

Recently it has been shown that FTY720 enters the nucleus, where it is phosphorylated by sphingosine kinase 2 (SphK2), and then nuclear FTY720-P binds and inhibits class I histone deacetylases (HDACs), enhancing specific histone acetylations. FTY720 is also phosphorylated in mice and accumulates in the brain, including the hippocampus, where it inhibits HDACs and enhances histone acetylation and gene expression programs associated with memory and learning, and rescues memory deficits independently of its immunosuppressive actions. Sphk2−/− mice have lower levels of hippocampal sphingosine-1-phosphate, an endogenous HDAC inhibitor, and reduced histone acetylation, and display deficits in spatial memory and impaired contextual fear extinction.

It has recently been shown that administration of clinically relevant doses of FTY720 to mice increased expression of NPC1 and −2 in brain and liver and decreased cholesterol in an SphK2-dependent manner (Newton et al, *FASEB J.* 2017 Apr.; 31(4): 1719-1730). FTY720 greatly increased expression of NPC1 and −2 in human NPC1 mutant fibroblasts that correlated with formation of FTY720-P and significantly reduced the accumulation of cholesterol and glycosphingolipids. However, a problem with the use of fingolimod is that it must be phosphorylated in the cell by sphingosine kinases before it can bind to the S1P receptors. This requirement may limit its efficacy or impose tissue selectivity of action, as not all individuals possess the relevant kinase necessary for activation thus rendering treatment in such individuals ineffective. More substantially, sphingoid bases such as sphingosine, a family to which fingolimod belongs, are known to disrupt NPC1 function (particularly at higher concentrations) and induce lysosomal expansion potentially therefore reversing the beneficial effects of fingolimod (Lloyd-Evans et al, *Nature Medicine,* 14, 1247-1255, 2008). This potentially adverse effect is also more likely because of an accumulation of fingolimod in the cells during the course of treatment leading thus to increased inhibition of NPC1 and reduced efficacy of the drug.

The inventors have designed novel derivatives of fingolimod and various analogues thereof, which are capable of acting as prodrugs for the known bio-active phosphate forms of the compound. Advantageously, these derivatives and analogues, or compounds, have been found to have increased uptake into target cells whilst avoiding the negative effects attributed to accumulation and lysosomal expansion as per the parent compound. Consequently, these compounds potentially represent superior therapeutics for use in the treatment of lysosomal storage disorders such as mucolipidoses, lipidoses, including NPC and Niemann-Pick type C2 (NPC2); neuronal ceroid lipofuscinoses (NCL), for example NCL types 1-10; and sphingolipidoses such as, Niemann-Pick types A and B, Gaucher disease, Fabry disease and Tay-Sachs disease; more especially NPC and particularly NPC1.

Notably, many NPC cellular phenotypes are also observed including endocytic transport abnormalities, defective autophagy, accumulation of free cholesterol, elevated levels of glycosphingolipids, and mycobacterial infection, such as BCG, and TB. We have found that infection with persistent intracellular mycobacteria, such as BCG and TB, induces the full range of NPC phenotypes in wild-type cells, and lipids shed by these mycobacteria were able to phenocopy NPC disease cellular phenotypes in the absence of the mycobacteria itself. Furthermore, therapies developed for the treatment of NPC disease promoted mycobacterial clearance, suggesting the compounds of the invention could also be used to treat any of the afore diseases or conditions, in particular mycobacterial infection, such as TB. We have also found that in Huntington's disease, the mutant Htt protein is necessary to transport NPC1 to lysosomes, leading to the presence of all NPC disease phenotypes and the potential for NPC therapies to work for HD.

SUMMARY

Therefore, in a first aspect of the present invention there is provided a compound of general formula (I) including all stereoisomers thereof and all isotopic variants thereof:

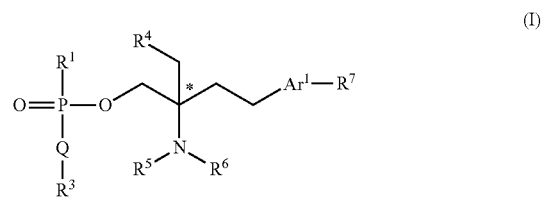

wherein
$R^1$ is —$OAr^2$ or -$Q'R^{3'}$;
wherein $Ar^2$ is a $C_{6-10}$ aryl or a 5-10 membered heteroaryl group optionally substituted with one or more substituents selected from OH, halo, nitro, $C_{1-6}$ alkyl, $C_{1-6}$ haloalkyl, —O($C_{1-6}$ alkyl), —O($C_{1-6}$ haloalkyl), $NH_2$, NH($C_{1-6}$ alkyl), N($C_{1-6}$ alkyl)$_2$ or $SF_5$;
Q and Q' are each independently O, S or $NR^2$;
$R^2$ is H or $C_{1-6}$ alkyl optionally substituted by one or more halo, OH or phenyl substituents;
$R^3$ and $R^{3'}$ are each independently $C_{1-10}$ alkyl or $C_{1-10}$ alkyl—C(O)O$R^{11}$, either or which is optionally substituted by one or more substituents $R^{12}$,
$R^{11}$ is $C_{1-6}$ alkyl, $C_{1-6}$ haloalkyl or benzyl;
$R^{12}$ is —O—$R^{13}$, —S$R^{13}$, Z, —Z—O—$R^{13}$, —O—Z—$R^{13}$, —Z—$R^{13}$, —C(O)$R^{13}$, —C(O)O$R^{13}$, $NR^{13}R^{14}$, C(O)$NR^{13}R^{14}$, —NHC(O)$R^{13}$, —NHC(O)O$R^{13}$, NH(C=NH)$NR^{13}R^{14}$, —OC(O)—$R^{13}$, —SC(O)$R^{13}$ or —S—S—$R^{13}$;
$R^{13}$ and $R^{14}$ are each independently H or $C_{1-6}$ alkyl;
Z is a $C_{6-10}$ aryl or a 5- to 10-membered heteroaryl group optionally substituted with one or more substituent selected from halo or OH;
or when Q or Q' is $NR^2$, $R^2$ and $R^3$ or $R^2$ and $R^{3'}$ together with the nitrogen atom to which they are attached, form a 5- or 6-membered heterocyclic ring substituted with C(O) O$R^{11}$, wherein $R^{11}$ is as defined above;
$R^4$ is OH or a group:

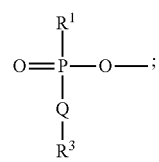

where $R^1$, Q and $R^3$ are as defined above;
each of $R^5$ and $R^6$ is independently selected from hydrogen or $C_{1-4}$ alkyl; or $R^5$ and $R^6$ together with the nitrogen atom to which they are attached may form a 5- or 6-membered heterocyclic ring optionally containing a further heteroatom selected from N, O or S;
$Ar^1$ is a phenyl or a 5- or 6-membered heteroaryl group, either of which is optionally substituted with one or more substituents selected from halo, OH, $C_{1-4}$ alkyl or $C_{1-4}$ haloalkyl; and
$R^7$ is $C_{1-10}$ alkyl optionally substituted with phenyl or a 5- or 6-membered heteroaryl group, wherein the phenyl or heteroaryl groups are optionally substituted with one or more substituents selected from halo, $NO_2$, OH, $C_{1-4}$ alkyl, $C_{1-4}$ haloalkyl, O($C_{1-4}$ alkyl) or phenyl optionally substituted with halo, OH, $C_{1-4}$ alkyl, $C_{1-4}$ haloalkyl or O($C_{1-4}$ alkyl), and is optionally labelled with a detectable label;
or a pharmaceutically or veterinarily acceptable salt or hydrate thereof.

The compounds of the present invention affect the NPC1 pathway, such that they are suitable for treating lysosomal storage disorders as well as defective autophagy, accumulation of free cholesterol, elevated levels of glycosphingolipids, and mycobacterial infection. In addition, there is evidence to suggest that they may also affect neuronal ceroid lipofuscinoses. The compounds of the present invention appear to be superior to fingolimod, the parent compound from which they are derived. Without wishing to be bound by theory, the inventors postulate that this is because the compounds of the invention do not require phosphorylation by sphingosine kinases. Since the phosphorylation appears to be a limiting step, this means that more of the pharmacophore is made available for binding to the S1P receptors with the compounds of the invention than with the parent compound.

In the present specification, the term "$C_1$-$C_6$ alkyl" refers to a straight or branched saturated hydrocarbon group having one to six carbon atoms. Examples include methyl, ethyl, n-propyl, isopropyl, t-butyl, n-hexyl, The terms "$C_{1-4}$ alkyl" and "$C_{1-10}$ alkyl have similar meanings except that they have 1-4 or 1-10 carbon atoms respectively and alkyl groups with other numbers of carbon atoms can be identified using such notation.

In the present specification "$C_{1-6}$ haloalkyl" refers to a $C_{1-6}$ alkyl group substituted with one or more halo atoms, up to per-substitution. Examples include chloromethyl, trifluoromethyl, 1,2-dibromoethyl.

The term "$C_{6-10}$ aryl" in the context of the present specification refer to a ring system with aromatic character having from 6 to 10 ring carbon atoms and containing a single ring or two fused rings. Where an aryl group contains two fused rings, both rings need not be fully aromatic in character. Examples of aromatic moieties are phenyl, naphthalene, tetrahydronaphthalene, indane and indene. $C_{6-14}$ aryl groups are as defined above but have from 6 to 14 ring carbon atoms. Examples include anthracene and fluorene.

The term "heteroaryl" in the context of the specification refer to a ring system with aromatic character having from 5 to 14 ring atoms (unless otherwise specified), at least one of which is a heteroatom selected from N, O and S, and containing up to three rings. Where a heteroaryl group contains more than one ring, not all rings must be fully aromatic in character. Examples of heteroaryl groups include pyridine, pyrimidine, indole, pyrrole, imidazole, triazole, tetrazole, oxazole, thiazole, benzofuran, benzimidazole and indolene.

The terms "heterocyclic" and "heterocyclyl" in the context of the specification refer to a ring system having 5-7 ring atoms (unless otherwise specified), at least one of which is a heteroatom selected from N, O and S, and which is not aromatic in character. Examples include piperidine, piperazine, pyrrolidine, morpholine and tetrahydrofuran.

In the present specification "halo" refers to fluoro, chloro, bromo or iodo.

Appropriate pharmaceutically and veterinarily acceptable salts of the compounds of general formulae (I) include basic addition salts such as sodium, potassium, calcium, aluminium, zinc, magnesium and other metal salts as well as choline, diethanolamine, ethanolamine, ethyl diamine, megulmine and other well known basic addition salts as summarised in Paulekuhn et al., (2007) *J. Med. Chem.* 50: 6665-6672 and/or known to those skilled in the art.

Salts which are not pharmaceutically or veterinarily acceptable may still be valuable as intermediates.

Suitably, in the compounds of general formula (I), the asymmetric carbon atom (*) to which the $NR^5R^6$, $CH_2R^4$, —$CH_2CH_2$—$Ar^1$—$R^7$ and the phosphate moiety:

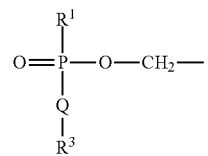

are attached is in the S-orientation.

In some suitable compounds of the present invention, $R^1$ is $OAr^2$. Suitably, in such compounds, $Ar^2$ is an aryl group such as phenyl, naphthyl, for example 1-naphthyl, or tetrahydronaphthyl, for example 5,6,7,8-tetahydro-1-naphthyl, any of which is optionally substituted with one or more substituents as set out above. When $Ar^2$ is a substituted phenyl group, the substituents are suitably in the 2- and/or 4- and/or 6-positions, particularly the 4-position.

In some compounds, the group $Ar^2$ is unsubstituted.

In other suitable compounds, $R^1$ is -$Q'R^{3'}$.

In some suitable compounds Q and/or Q' (when present) is O.

In some suitable compounds Q and/or Q' (when present) is S.

In some suitable compounds Q and/or Q' (when present) is $NR^2$ where $R^2$ is H or $C_{1-4}$ alkyl optionally substituted with one or more halo, OH or phenyl substituents. In some cases, $R^2$ is H or unsubstituted $C_{1-4}$ alkyl, for example H, methyl or ethyl but especially H or methyl.

In the compounds of the invention, $R^3$ and/or $R^{3'}$ (when present) is suitably a group $C_{1-10}$ alkyl—$C(O)OR^{11}$. Such $R^3$ and $R^{3'}$ groups are particularly suitable in the case where Q or Q' is $NR^2$.

In some more suitable compounds, $R^3$ and/or $R^{3'}$ (when present) may be —$C(R^{12a}R^{12b})C(O)OR^{11}$ or —$C(R^{12a}R^{12b})CH_2C(O)OR^{11}$;

wherein $R^{11}$ is as defined above;

$R^{12a}$ is H or $C_{1-6}$ alkyl optionally substituted by a group $R^{12}$ as defined above;

$R^{12b}$ is H, methyl or ethyl, more suitably H or methyl and especially H.

In some cases, $R^3$ and/or $R^{3'}$ (when present) is —$C(R^{12a}R^{12b})CH_2C(O)OR^{11}$, where both $R^{12a}$ and $R^{12b}$ are H, such that $R^3$ and/or $R^{3'}$ (when present) is —$CH_2CH_2C(O)OR^{11}$.

Compounds in which $R^3$ and/or $R^{3'}$ (when present) is —$C(R^{12a}R^{12b})C(O)OR^{11}$ are particularly suitable.

Often, $R^{12a}$ is an amino acid side chain. In some cases, $R^{12a}$ may be a side chain of a naturally-occurring amino acid, where the naturally occurring amino acid may be alanine, valine, leucine, isoleucine, methionine, phenylalanine, tyrosine, tryptophan, arginine, histidine, lysine, aspartic acid, glutamic acid, serine, threonine, asparagine, glutamine, cysteine, glycine or proline.

Usually, when $R^{12a}$ is an amino acid side chain, it has L-stereochemistry.

Alternatively, $R^{12a}$ may be a side chain of an amino acid having D-stereochemistry, for example D-alanine.

$R^{12a}$ may suitably be a side chain of alanine, glycine, valine, leucine, isoleucine, phenylalanine, tyrosine, methionine or tryptophan, for example a side chain of alanine such that $R^{12a}$ is methyl.

Suitably $R^{12b}$ is $C_{1-4}$ alkyl or H, especially H.

In some cases, the amino acid side chains may be modified such that OH and/or SH groups are replaced with O—$C_{1-6}$ alkyl or S—$C_{1-6}$ alkyl and/or carboxylic acid groups are esterified as a $C_{1-6}$ alkyl or benzyl ester.

Therefore, suitably, in the compounds where $R^3$ and/or $R^{3'}$ (when present) is substituted with one or more substituents $R^{12}$, when present, each of $R^{13}$ and $R^{14}$ is $C_{1-6}$ alkyl, more usually $C_{1-4}$ alkyl, for example methyl or ethyl and especially methyl.

When Q is $NR^2$, $R^2$ and $R^3$ together with the nitrogen atom to which they are attached, form a 5- or 6-membered heterocyclic ring substituted with $C(O)OR^{11}$, wherein $R^{11}$ is as defined above.

Similarly when $R^1$ is $Q'R^{3'}$ and Q' is $NR^2$, $R^2$ and $R^{3'}$ together with the nitrogen atom to which they are attached, form a 5- or 6-membered heterocyclic ring substituted with $C(O)OR^{11}$, wherein $R^{11}$ is as defined above.

Suitably, the ring is a 5-membered ring, for example a pyrrolidinyl ring.

More suitably, the ring is a pyrrolidin-1-yl ring substituted at the 2-position with $C(O)OR^{11}$, wherein $R^{11}$ is as defined above. Compounds of this type are proline derivatives.

In some other suitable compounds of the present invention, $R^3$ is $C_{1-10}$ alkyl substituted with, —OC(O)—$R^{13}$, —SC(O)$R^{13}$ or —S—S—$R^{13}$, where $R^{13}$ is H or $C_{1-6}$ alkyl, more usually $C_{1-6}$ alkyl. These $R^3$ groups are typically found in compounds of general formula (I) in which Q is O or S, particularly O.

More suitably $R^3$ is $C_{1-6}$ alkyl substituted with —OC(O)—$R^{13}$, —SC(O)$R^{13}$ or —S—S—$R^{13}$, for example $C_{1-4}$ alkyl substituted with —OC(O)—$R^{13}$, —SC(O)$R^{13}$ or —S—S—$R^{13}$. Examples of this type of $R^3$ group include —$CH_2CH_2$—OC(O)—($C_{1-6}$ alkyl), —$CH_2CH_2$—SC(O)—($C_{1-6}$ alkyl) and —$CH_2CH_2$—S—S—($C_{1-6}$ alkyl).

In some suitable compounds of the present invention at least one of $R^5$ and $R^6$ is H. More suitably, both $R^5$ and $R^6$ are H.

Suitable $Ar^1$ groups include phenyl which may be substituted with one or more halo, methyl, ethyl, halomethyl or haloethyl substituents. Particularly suitable substituents include fluoro, chloro, methyl, ethyl and trifluoromethyl.

When $Ar^1$ is phenyl, the —$R^7$ moiety is suitably positioned at the 2-, 4- or 6-position of the phenyl ring with respect to the —$CH_2CH_2$— linker group. Most suitably, the —$R^7$ moiety is positioned at the 4-position of the phenyl ring with respect to the —$CH_2CH_2$— linker group.

Other suitable $Ar^1$ groups include 5- or 6-membered heteroaryl groups such as pyridine, pyrimidine, or pyrrole, any of which may be substituted as described above, particularly with one or more halo, methyl, ethyl, halomethyl or haloethyl substituents.

One example of this type of $Ar^1$ group is pyrrole, which is optionally substituted as described above. In some cases, a pyrrole group may be N-substituted with a $C_{1-4}$ alkyl group, for example a methyl or ethyl group and especially with a methyl group.

In some compounds of the present invention, $R^7$ is $C_{1-10}$ alkyl, especially $C_{6-10}$ alkyl. Suitably, the alkyl group is a straight chain alkyl group and particularly suitable examples of such groups include n-heptyl or n-octyl groups. $R^7$ is most suitably n-octyl.

In other compounds, $R^7$ is $C_{1-10}$ alkyl optionally substituted with phenyl or a 5- or 6-membered heteroaryl group, wherein the phenyl or heteroaryl group is optionally substituted with one or more substituents selected from optionally substituted with one or more substituents selected from halo, OH, $C_{1-4}$ alkyl, $C_{1-4}$ haloalkyl, $O(C_{1-4}$ alkyl) or phenyl optionally substituted with halo, OH, $C_{1-4}$ alkyl, $C_{1-4}$ haloalkyl or $O(C_{1-4}$ alkyl).

More suitably in such compounds, $R^7$ is $C_{1-6}$ alkyl, especially $C_{1-4}$ alkyl, optionally substituted with phenyl or a 5- or 6-membered heteroaryl group, wherein the phenyl or heteroaryl group is optionally substituted as described above. More suitable substituents include $C_{1-4}$ alkyl or phenyl substituted with $C_{1-4}$ alkyl. In particularly suitable compounds, the phenyl or heteroaryl group is unsubstituted or is substituted with methyl, ethyl or phenyl which is unsubstituted or substituted with a methyl or ethyl group.

In this type of compound, $R^7$ is more suitably an alkyl group substituted with a phenyl group, wherein the phenyl group is optionally substituted as described above. Particularly suitable $R^7$ groups include $C_{1-6}$ alkyl substituted with phenyl, tolyl or biphenyl.

In some cases, $R^7$ is labelled with a detectable label. In other cases $R^7$ is not labelled with a detectable label.

Detectable labels are well known in the art and include fluorescent labels, visible labels or isotopic labels.

Fluorescent labels are well known and include derivatives of aromatic or heteroaromatic compounds such as xanthene, naphthaline, coumarin, anthracene, benzo[c][1,2,5]oxadiazole, pyrene or acridine. Other known fluorescent labelling compounds are based on molecules such as cyanine.

Visible labels are also known and include dyes and coloured beads.

Fluorescent and visible labels may be covalently attached to the $R^7$ moiety, for example via an amide bond.

The $R^7$ moiety may also be isotopically labelled such that one or more atoms in the $R^7$ moiety is replaced by an atom which is chemically the same but which has a different molecular weight. For example, one or more of the carbon atoms may be $^{14}C$ or one or more hydrogen atoms may be $^2H$ or $^3H$.

Fluorescent labels are particularly suitable.

In suitable compounds of the present invention, the moiety:

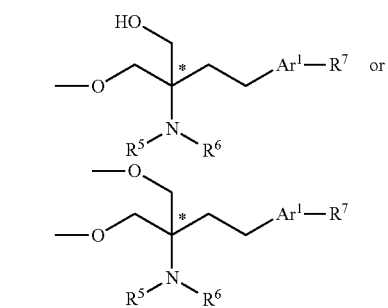

is a residue of an S1P modulator of formula:

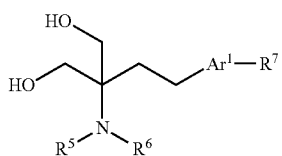

Examples of such compounds include fingolimod, which has the following structure:

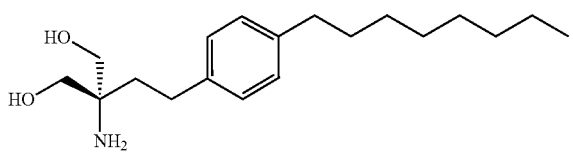

Particularly suitable compounds of general formula (I) are compounds in which, independently or in any combination:
$R^4$ is OH;
$R^5$ is H;
$R^6$ is H;
$R^1$ is —$OAr^1$ and $Ar^1$ is phenyl;
the $R^7$ moiety is positioned at the 4-position of the phenyl ring with respect to the —$CH_2CH_2$— linker group;
$R^7$ is $C_{6-10}$ alkyl or $C_{3-5}$ alkyl substituted with ($C_{1-2}$ alkyl) phenyl;
the C* centre has S stereochemistry.

Especially suitable are compounds in which independently or in any combination:
$R^4$ is OH
$R^5$ is H;
$R^6$ is H;
$R^1$ is —$OAr^1$ and $Ar^1$ is phenyl;
the $R^7$ moiety is positioned at the 4-position of the phenyl ring with respect to the —$CH_2CH_2$— linker group;
$R^7$ is n-octyl; and
the C* centre has S stereochemistry.

Some particularly suitable compounds of general formula (I) are derivatives of Fingolimod, in which the moiety —O—$CH_2$—C($CH_2OH$)($NR^5R^6$)—$CH_2CH_2$—$Ar^1$—$R^7$ is

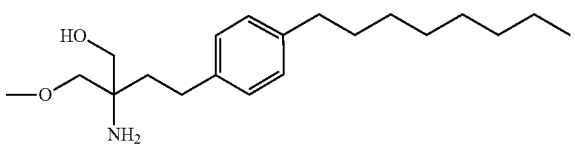

and especially the S enantiomer:

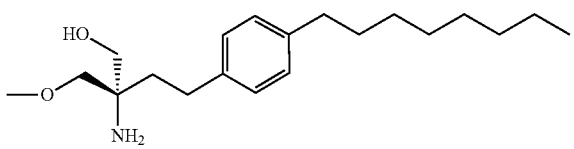 [SMILES: CCCCCCCCc1ccc(CC[C@](N)(CO)COC)cc1]

Examples of compounds of general formula (I) include:
(2S)-methyl 2-(((2-amino-2-(hydroxymethyl)-4-(4-octylphenyl)butoxy)(phenoxy)phosphoryl)amino)propanoate;
benzyl 2-(((2-amino-2(hydroxymethyl)-4-(4-octylphenyl)butoxy)(phenoxy) phosphoryl)amino)acetate;
(2S) benzyl-2-(((2-amino-2-(hydroxymethyl)-4-(4-octylphenyl)butoxy) (phenoxy)phosphoryl)amino)-4-methylpentanoate;
(2S) benzyl-1-((2-amino-2-(hydroxymethyl)-4-(4-octylphenyl)butoxy) (phenoxy)phosphoryl)pyrrolidine-2-carboxylate;
(2S) ethyl-2-(((2-amino-2-(hydroxymethyl)-4-(4-octylphenyl)butoxy)(phenoxy) phosphoryl)amino)-propanoate;
(2R)-benzyl 2-(((2-amino-2-(hydroxymethyl)-4-(4-octylphenyl)butoxy) (naphthalen-1-yloxy)phosphoryl)amino) propanoate;
(2R)-neopentyl 2-(((2-amino-2-(hydroxymethyl)-4-(4-octylphenyl)butoxy) (naphthalen-1-yloxy)phosphoryl) amino) propanoate; methyl 3-(((2-amino-2-(hydroxymethyl)-4-(4-octylphenyl)butoxy(naphthalen-1-yloxy) phosphoryl)amino)propanoate;
(2R)-neopentyl-2-(((2-amino-2-(hydroxymethyl)-4-(4-octylphenyl)butoxy) ((5,6,7,8-tetrahydronaphthalen-1-yl) oxy)phosphoryl) amino)propanoate; isopropyl-2-(((2-amino-2-(hydroxymethyl)-4-(4-octylphenyl)butoxy) (phenoxy)phosphoryl)amino)-2-methylpropanoate;
(2R)-benzyl-2-(((2-amino-2-(hydroxymethyl)-4-(4-octylphenyl)butoxy) (naphthalen-1-yloxy)phosphoryl)amino) propanoate;
(2S)-ethyl-2-(((2-amino-2-(hydroxymethyl)-4-(4-octylphenyl)butoxy) (phenoxy)phosphoryl)amino)-4-(methylthio) butanoate;
(2S)-methyl-2-(((2-amino-2-(hydroxymethyl)-4-(4-octylphenyl)butoxy) (phenoxy)phosphoryl)amino)-3-(4-(tert-butoxy)phenyl)propanoate;
(2R)-dimethyl-2-(((2-amino-2-(hydroxymethyl)-4-(4-octylphenyl)butoxy) (phenoxy)phosphoryl)amino)pentanedioate;
(2S)-methyl-2-(((2-amino-2-(hydroxymethyl)-4-(4-octylphenyl)butoxy) (phenoxy)phosphoryl)amino)-3-(1H-indol-3-yl)propanoate;
(2S,3R)-methyl-2-(((2-amino-2-(hydroxymethyl)-4-(4-octylphenyl)butoxy) (naphthalen-1-yloxy)phosphoryl) amino)-3-(tert-butoxy)butanoate;
(2R)-methyl-2-(((2-amino-2-(hydroxymethyl)-4-(4-octylphenyl)butoxy) (phenoxy)phosphoryl)amino)-6-((tert-butoxycarbonyl) amino)hexanoate;
S-(2-(((2-amino-2-(hydroxymethyl)-4-(4-octylphenyl) butoxy)(phenoxy) phosphoryl)oxy)ethyl) 2,2-dimethylpropanethioate;
pentyl (2S)-2-[({2-amino-3-hydroxy-2-[2-(4-octylphenyl)ethyl]propoxy}(4-methoxyphenoxy)phosphoryl)amino] propanoate;
methyl 2-(((2-amino-2-(hydroxymethyl)-4-(4-octylphenyl)butoxy)(phenoxy) phosphoryl)amino)acetate;
ethyl 2-(((2-amino-2-(hydroxymethyl)-4-(4-octylphenyl) butoxy)(phenoxy) phosphoryl)amino)acetate;
(3S)-methyl 2-(((2-amino-2-(hydroxymethyl)-4-(4-octylphenyl)butoxy) (phenoxy)phosphoryl)amino)-3-methylpentanoate;
(2S) pentyl-2-(((2-amino-2-(hydroxymethyl)-4-(4-octylphenyl)butoxy) (phenoxy)phosphoryl)amino)-3-phenylpropanoate;
and their pharmaceutically acceptable salts, esters and hydrates and all stereochemistries.

The compounds of general formula (I) may be prepared by the methods described below. As will be apparent to those skilled in the art, conventional protecting groups may be necessary to prevent certain functional groups from undergoing undesired reactions. Suitable protecting groups for various functional groups as well as suitable conditions for protecting and de-protecting particular functional groups are well known in the art. For example, numerous protecting groups are described in T. W. Greene and G. M. Wuts, Protecting Groups in Organic Synthesis, Third Edition, Wiley, New York, 1999, and references cited therein.

Compounds of general formula (I) in which $R^5$ and $R^6$ are both H may be prepared from analogues of the compounds of general formula (I) in which one of $R^5$ and $R^6$ is replaced with —C(O)OR$^{15}$, wherein R$^{15}$ is $C_{1-6}$ alkyl or $C_{6-14}$ aryl optionally substituted with one or more substituents selected from $C_{1-6}$ alkyl, $C_{1-6}$ haloalkyl or halo;

by removal of the protecting group, for example by hydrogenation using a suitable catalyst, such as palladium/carbon. The reaction may be conducted in a solvent such as methanol. The preparation of these analogues is described below.

Compounds of general formula (I) may be prepared by the reaction of a compound of general formula (II):

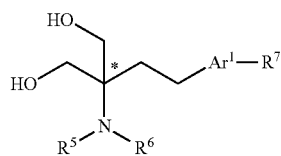

(II)

wherein $R^5$, $R^6$, $Ar^1$ and $R^7$ are as defined for general formula (I);

with a compound of general formula (III):

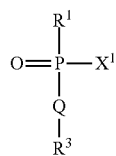

(III)

wherein:

Q, $R^1$ and $R^3$ are as defined for general formula (I); and $X^1$ is halo, particularly chloro.

When Q is $NR^2$, O and S the compound of general formula (III) will be a compound of general formula (IIIa), (IIIb) or (IIIc) respectively:

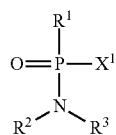

(IIIa)

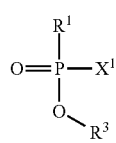

(IIIb)

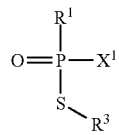

(IIIc)

The compound of general formula (II) may firstly be reacted with a hindered base, for example a Grignard reagent, following which the product is reacted with the compound of general formula (III). The reaction may be conducted in an anhydrous organic solvent, for example tetrahydrofuran and at a temperature of about 15 to 25° C., typically at room temperature.

This reaction give rise to a mixture of mono compounds of general formula (I) in which $R^4$ is OH and bis compounds of general formula (I) in which $R^4$ is a group:

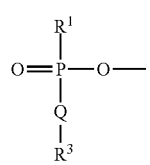

The products can be separated by standard methods, for example HPLC or LC-MS.

This method for the preparation of a compound of general formula (I) is itself an aspect of the invention.

Many compounds of general formula (II) are well known pharmaceutical agents and are readily available. Other compounds of general formula (II) can readily be synthesised by a person of skill in the art using standard methods.

Analogues of compounds of general formula (II) in which one of $R^5$ and $R^6$ is replaced with —C(O)OR$^{15}$, wherein R$^{15}$ is as defined above, may be prepared from compounds of general formula (II) in which $R^5$ and $R^6$ are both H by reaction with a compound of general formula (IX):

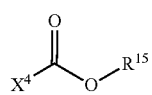

(IX)

wherein R$^{15}$ is as defined for general formula (I) and $X^4$ is halo, particularly chloro.

Suitably, the reaction is carried out in the presence of a base such as sodium bicarbonate and in an organic solvent such as chloroform.

These analogues may be converted into analogues of the compounds of general formula (I) wherein one of $R^5$ and $R^6$ is replaced with —C(O)OR$^{15}$ by reaction with a compound of formula (III) as defined above.

Compounds of general formula (III) may be prepared from a compound of general formula (IV):

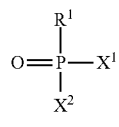

(IV)

wherein $R^1$ is as defined for general formula (I), $X^1$ is as defined for general formula (III) and $X^2$ is halo, particularly chloro;

by reaction with a compound of general formula (V):

Compounds of general formula (V) in which Q is $NR^2$, O and S have, respectively, formulae (Va), (Vb) and (Vc)

wherein $R^2$ and $R^3$ are as defined for general formula (I).

Suitably the reaction is carried out in an anhydrous organic solvent such as dichloromethane and in the presence of a Lewis base such as trimethylamine. The compound of general formula (IV) may be added to a solution of the compound of general formula (V) which is suitably cooled to a temperature of about −78° C., stirred at this temperature for 15 to 60 minutes and then allowed to warm to 15-25° C. (room temperature) and the reaction is continued for 1-4 hours.

Compounds of general formula (V) are well known in the art. For example compounds of general formula (Va) may be amino acids, amino acid derivatives or amines. These compounds are readily available or may be prepared by well-known methods. Compounds of general formulae (Vb) and (Vc) are also known or may be synthesised by known methods, for example as set out in Example 19 below.

Compounds of general formula (IV) may be prepared from compounds of general formula (VI):

wherein $Ar^2$, $R^8$ and $R^9$ are as defined for general formula (I);

by reaction with a compound of general formula (VIII):

wherein $X^1$ is as defined for general formula (III), $X^2$ is as defined for general formula (IV) and $X^3$ is halo, particularly chloro. The compound of general formula (VII) may be used as a suitable salt form.

Suitably the reaction is carried out in an anhydrous organic solvent such as diethyl ether and in the presence of a Lewis base such as trimethylamine. The reagents are mixed at low temperature, typically about −78° C., stirred at this temperature for 15 to 60 minutes and then allowed to warm to 15-25° C. (room temperature) and the reaction is continued for 1-4 hours.

Compounds of general formulae (VI), (VII) and (VIII) are well known and readily available. Phosphorus oxychloride is a particularly suitable example of a compound of general formula (VIII).

As discussed above, the compounds of the present invention are useful for the treatment of conditions affected by the NPC1 pathway. This includes lysosomal storage disorders including Niemann-Pick C1, Niemann-Pick type C2, Niemann-Pick types A and B and other lysosomal storage disorders such as neuronal ceroid lipofuscinoses (NCL), mucolipidoses, lipidoses and sphingolipidoses such as, Gaucher disease, Fabry disease and Tay-Sachs disease; defective autophagy, accumulation of free cholesterol, which leads to conditions such as Smith-Lemli-Opitz syndrome and mycobacterial diseases such as tuberculosis and BCG as well as Huntington's disease.

Fingolimod type compounds have been previously tested on NPC cells and appear to have benefits. This is assumed to be due to their role as HDAC inhibitors, leading to upregulation of the NPC1 protein. However, fingolimod is similar to sphingosine, which is known to be an early storage molecule in NPC, which means that there is potential for it to initiate downstream lipid storage when used at higher concentrations, thus cancelling out its beneficial effects. The compounds of the invention are believed to be more effective than the parent compounds from which they are derived because they do not require phosphorylation by sphingosine kinase in order to be converted to the active form. The inventors have demonstrated that when NPC1-null cells are treated with the compounds of the invention, the compounds reduced lysosomal expansion and lipid storage to a greater extent than fingolimod. It appears that the compounds of the invention may also act on one or more of the neuronal ceroid lipofuscinoses.

Furthermore, the inventors have demonstrated that the compounds have good stability in human plasma, with a half-life for some compounds of around 7 hours, meaning that the compounds are suitable for once or twice daily dosing. Furthermore, the inventors have demonstrated that the compounds are stable both in acidic and basic conditions, so that they are likely to be suitable for use in an oral dosage form.

Therefore, in a further aspect of the invention there is provided a compound of general formula (I) for use in medicine.

There is also provided a compound of general formula (I) for use in the treatment of lysosomal storage disorders including Niemann-Pick C1, Niemann-Pick type C2, Niemann-Pick types A and B and other lysosomal storage disorders such as neuronal ceroid lipofuscinoses (NCL), mucolipidoses, lipidoses and sphingolipidoses such as, Gaucher disease, Fabry disease and Tay-Sachs disease; defective autophagy, accumulation of free cholesterol and endocytic transport defects, which leads to conditions such as Smith-Lemli-Opitz syndrome and contributes to pathogenesis in Huntington's disease, or mycobacterial diseases such as tuberculosis and BCG.

Further, the invention provides the use of a compound of general formula (I) in the preparation of an agent for the treatment of lysosomal storage disorders including Niemann-Pick C1, Niemann-Pick type C2, Niemann-Pick types A and B and other lysosomal storage disorders such as neuronal ceroid lipofuscinoses (NCL), mucolipidoses, lipidoses and sphingolipidoses such as, Gaucher disease, Fabry disease and Tay-Sachs disease; defective autophagy, accumulation of free cholesterol and endocytic transport defects, which leads to conditions such as Smith-Lemli-Opitz syndrome and contributes to pathogenesis in Huntington's disease, or mycobacterial diseases such as tuberculosis and BCG.

In another aspect, the invention provides a method for the treatment of lysosomal storage disorders including Niemann-Pick C1, Niemann-Pick type C2, Niemann-Pick types A and B and other lysosomal storage disorders such as neuronal ceroid lipofuscinoses (NCL), mucolipidoses, lipidoses and sphingolipidoses such as, Gaucher disease, Fabry disease and Tay-Sachs disease; defective autophagy, accumulation of free cholesterol and endocytic transport defects, which leads to conditions such as Smith-Lemli-Opitz syndrome and contributes to pathogenesis in Huntington's disease, or mycobacterial diseases such as tuberculosis and BCG, the method comprising administering to a patient in need of such treatment an effective amount of a compound of general formula (I).

Preferably, the disease to be treated is selected from lysosomal storage disorders including Niemann-Pick C1, Niemann-Pick type C2, Niemann-Pick types A and B and other lysosomal storage disorders such as neuronal ceroid lipofuscinoses (NCL), lipidoses and sphingolipidoses such as, Gaucher disease, Fabry disease and Tay-Sachs disease; defective autophagy, accumulation of free cholesterol and endocytic transport defects, which leads to conditions such as Smith-Lemli-Opitz syndrome and contributes to pathogenesis in Huntington's disease, or mycobacterial diseases such as tuberculosis and BCG.

In some cases, the disease to be treated is Niemann-Pick disease, particularly NPC and especially NPC1.

In other cases, the disease to be treated is Gaucher disease, Fabry disease or Tay-Sachs disease In other cases, the disease to be treated is accumulation of free cholesterol or an endocytic transport defect, for example in Smith-Lemli-Opitz syndrome or Huntington's disease.

In still other cases, the disease to be treated is a mycobacterial infection, particularly tuberculosis or BCG and especially TB.

The compounds of the present invention will usually be administered in a pharmaceutical composition and therefore in a further aspect of the invention there is provided a pharmaceutical composition comprising a compound of general formula (I) and a pharmaceutically acceptable excipient or carrier.

The composition may be administered by any appropriate route, for example oral, buccal, nasal, transdermal or parenteral, for example intravenous or intramuscular.

As discussed above, the inventors have shown that many compounds of the present invention are stable in acidic environment, with a half-life of over 12 hours in a solution buffered to pH 1.5 to mimic conditions in the stomach. The compounds of the invention also have good stability in a basic environment with a half-life of about 13 hours in simulated intestinal fluid at pH8. In view of this, the compounds are particularly suited for oral administration.

The compounds of general formula (I) in which $R^1$ is $OAr^2$ are, in general, particularly stable. In the case of such compounds which are unstable, they decompose to form compounds of general formula (I) in which $R^1$ and $R^4$ together with the atoms to which they are attached form a 6-membered heterocyclic ring. This compound eventually is hydrolysed to fingolimod monophosphate, the pharmacologically active compound Formulations for oral administration in the present invention may be presented as: discrete units such as capsules, sachets, tablets, troches or lozenges each containing a predetermined amount of the active agent; as a powder or granules; as a solution or a suspension of the active agent in an aqueous liquid or a non-aqueous liquid; or as an oil-in-water liquid emulsion or a water in oil liquid emulsion; or as a syrup or elixir; or as a bolus, etc.

For compositions for oral administration (e.g. tablets, capsules, formulations comprising a mucoadherent etc), the term "acceptable carrier" includes vehicles such as common excipients e.g. binding agents, for example syrup, acacia, gelatin, sorbitol, tragacanth, polyvinylpyrrolidone (povidone), methylcellulose, ethylcellulose, sodium carboxymethylcellulose, hydroxypropylmethylcellulose, sucrose and starch; fillers and carriers, for example corn starch, gelatin, lactose, sucrose, microcrystalline cellulose, kaolin, mannitol, dicalcium phosphate, sodium chloride and alginic acid; wetting agents/surfactants such as poloxamers, polysorbates, sodium docusate and sodium lauryl sulfate; disintegrants such as starch or sodium starch glycolate; and lubricants such as magnesium stearate, sodium stearate and other metallic stearates, glycerol stearate, stearic acid, silicone fluid, talc waxes, oils and colloidal silica. Sweetening agents and flavouring agents such as peppermint, oil of wintergreen, cherry flavouring and the like can also be used. It may be desirable to add a colouring agent to make the dosage form readily identifiable. Tablets may also be coated by methods well known in the art.

A tablet may be made by compression or moulding, optionally with one or more accessory ingredients. Compressed tablets may be prepared by compressing in a suitable machine the active agent in a free flowing form such as a powder or granules, optionally mixed with a binder, lubricant, inert diluent, preservative, surface-active or dispersing agent. Moulded tablets may be made by moulding in a suitable machine a mixture of the powdered compound moistened with an inert liquid diluent. The tablets may optionally be coated or scored and may be formulated so as to provide slow or controlled release of the active agent.

Some formulations may comprise a mucoadherent, for example a mucopolysaccharide such as sodium hyaluronate. Such compositions may be formulated as, for example, liquids, liquid syrups, soft gels, liquid gels, flowable gels or aqueous suspensions and may, in addition to the active agent and the mucoadherent, also contain one or more additional excipients as set out above. Liquid formulations will usually also contain a liquid carrier, which may be a solvent or suspending agent, for example water or saline solution and may also contain a substance to increase their viscosity, for example sodium carboxymethylcellulose, sorbitol or dextran.

Other formulations suitable for oral administration include lozenges comprising the active agent in a flavoured base, usually sucrose and acacia or tragacanth; pastilles comprising the active agent in an inert base such as gelatin and glycerin, or sucrose and acacia; and mouthwashes comprising the active agent in a suitable liquid carrier.

For topical application to the skin, the composition may be made up into a cream, ointment, jelly, solution or suspension etc. Cream or ointment formulations that may be used for the drug are conventional formulations well known in the art, for example, as described in standard text books of pharmaceutics such as the British Pharmacopoeia.

The composition defined above may be used for the treatment of the respiratory tract by nasal, bronchial or buccal administration of, for example, aerosols or sprays which can disperse the pharmacological active ingredient in the form of a powder or in the form of drops of a solution or suspension. Pharmaceutical compositions with powder-dispersing properties include dry powder inhalers and metered dose inhalers. Dry powder inhalers usually contain, in addition to the active ingredient, a suitable carrier such lactose and, if desired, adjuncts, such as surfactants and/or diluents and/or flow aids and/or lubricants. Metered dose inhalers for dispersing powders usually contain, in addition to the active ingredient, a liquid propellant with a boiling point below room temperature and, if desired, adjuncts, such as liquid or solid non-ionic or anionic surfactants and/or diluents. Pharmaceutical compositions for treatment of the respiratory tract in which the pharmacologically active ingredient is in solution (e.g., either solution for nebulisation or metered dose inhalers) contain, in addition to this, a suitable propellant, and furthermore, if necessary, an additional solvent and/or a stabiliser. Instead of the propellant, compressed air can also be used, it being possible for this to be produced as required by means of a suitable compression and expansion device.

Parenteral formulations will generally be sterile.

The invention will now be described in greater detail with reference to the examples and the drawings which are as follows:

BRIEF DESCRIPTION OF THE DRAWING FIGURES

FIG. 1: $^{31}$P NMR overlay spectra (202 MHz) of pentyl (2S)-2-[({2-amino-3-hydroxy-2-[2-(4-octylphenyl)ethyl]propoxy}(4-methoxyphenoxy)phosphoryl)amino]propanoate incubate in deuterated acetone and Trizma buffer and in presence of Carboxypeptidase Y (Aldrich). The figure shows that the Prodrug is rapidly activated by the esterase.

Figure 2:
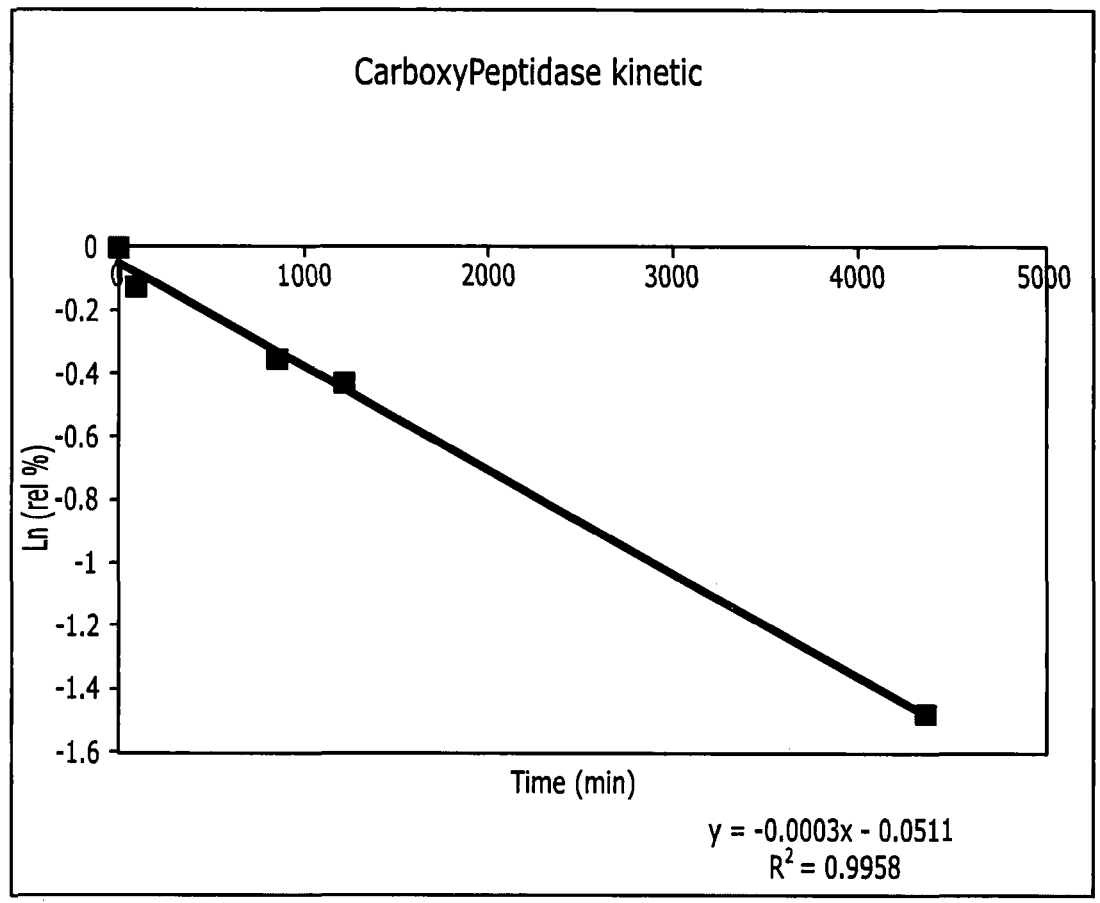

FIG. 2: Half-life calculation for compound pentyl (2S)-2-[({2-amino-3-hydroxy-2-[2-(4-octylphenyl)ethyl]propoxy}(4-methoxyphenoxy)phosphoryl)amino]propanoate in presence of Carboxypeptidase Y.

Figure 3:
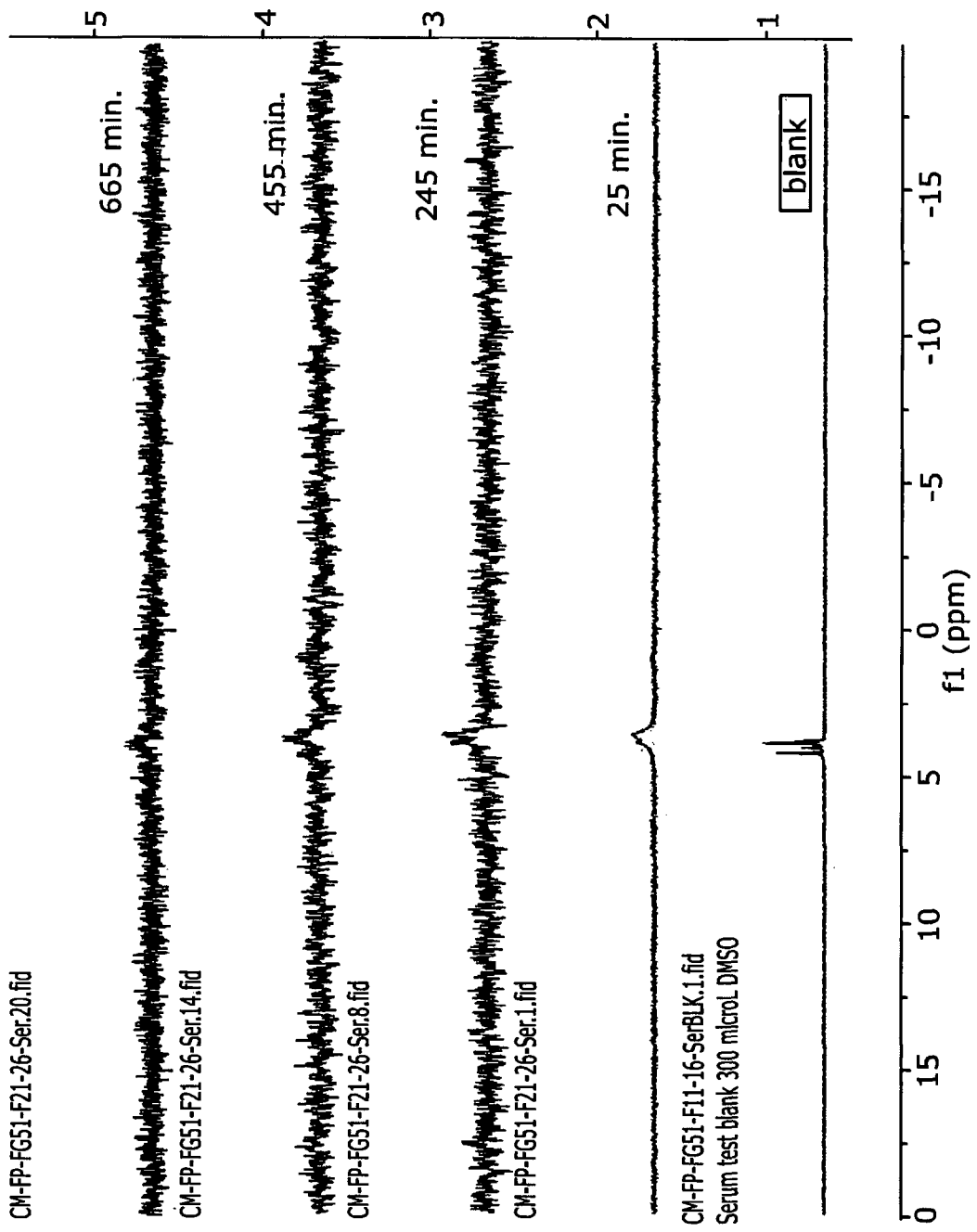

FIG. 3: $^{31}$P NMR (202 MHz) overlay spectra of compound pentyl (2S)-2-[({2-amino-3-hydroxy-2-[2-(4-octylphenyl)ethyl]propoxy}(4-methoxyphenoxy)phosphoryl)amino]propanoate in Human Serum. The figure shows that the prodrug is stable in human serum for at least 665 minutes.

Figure 4:
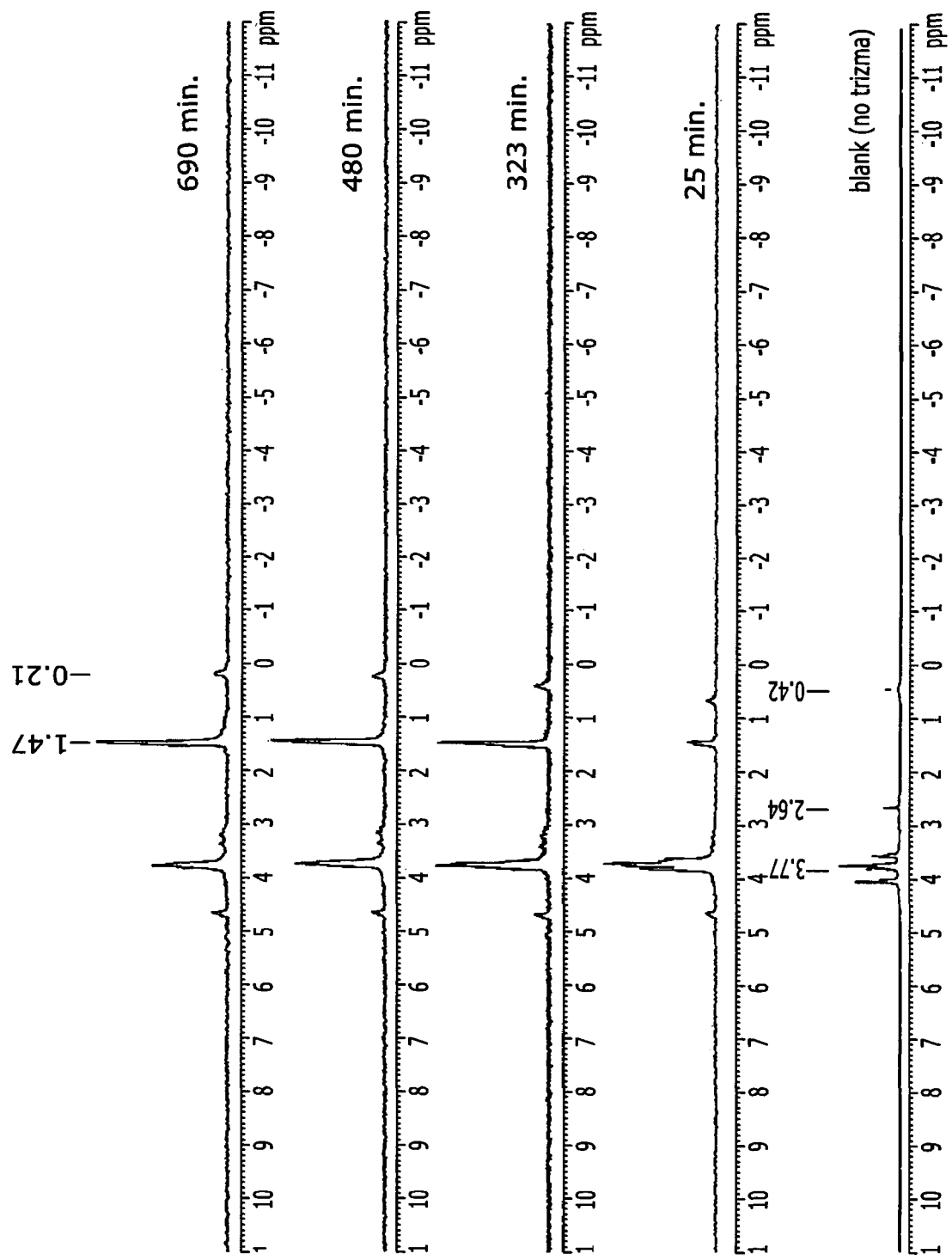

FIG. 4: $^{31}$P overlay spectra (202 MHz) of pentyl (2S)-2-[({2-amino-3-hydroxy-2-[2-(4-octylphenyl)ethyl]propoxy}(4-methoxyphenoxy)phosphoryl)amino]propanoate in B95a cell lysate at pH 7.6.

Figure 5:
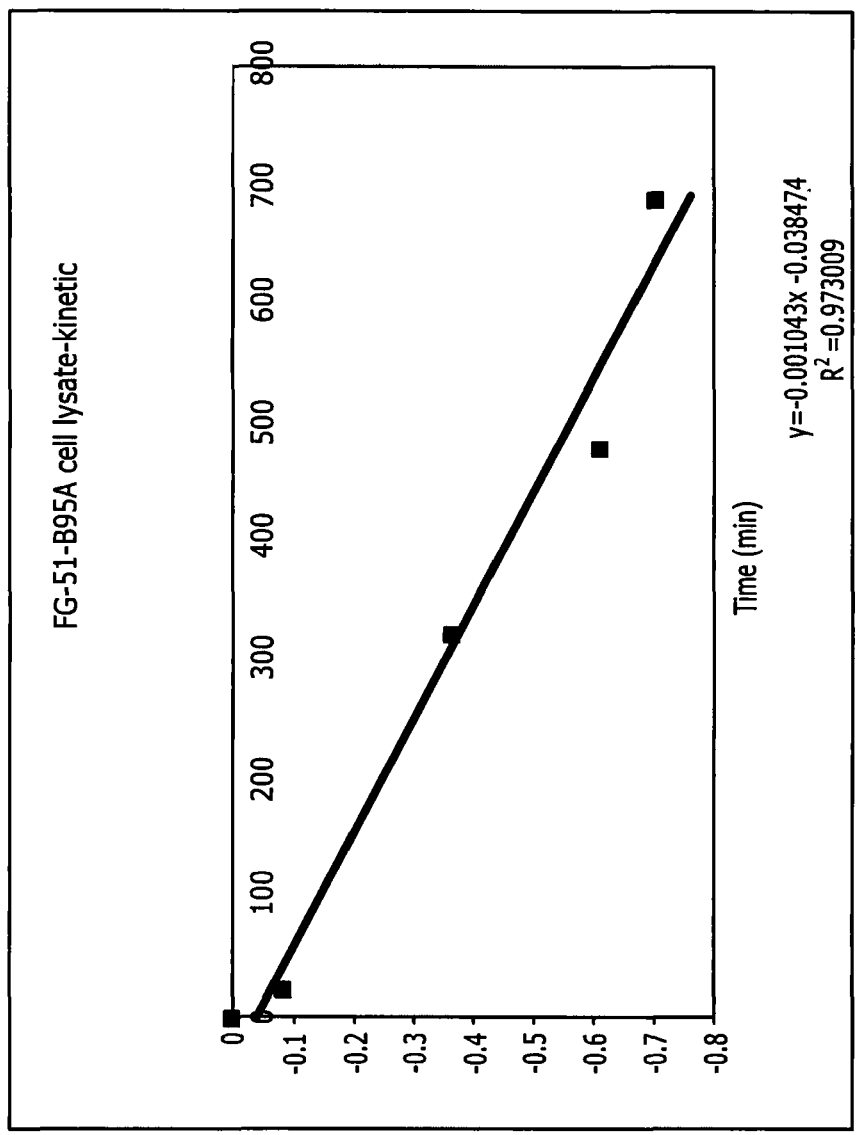

FIG. 5: half-life for pentyl (2S)-2-[({2-amino-3-hydroxy-2-[2-(4-octylphenyl)ethyl]propoxy}(4-methoxyphenoxy)phosphoryl)amino]propanoate in B95a cell lysate.

Figure 6:
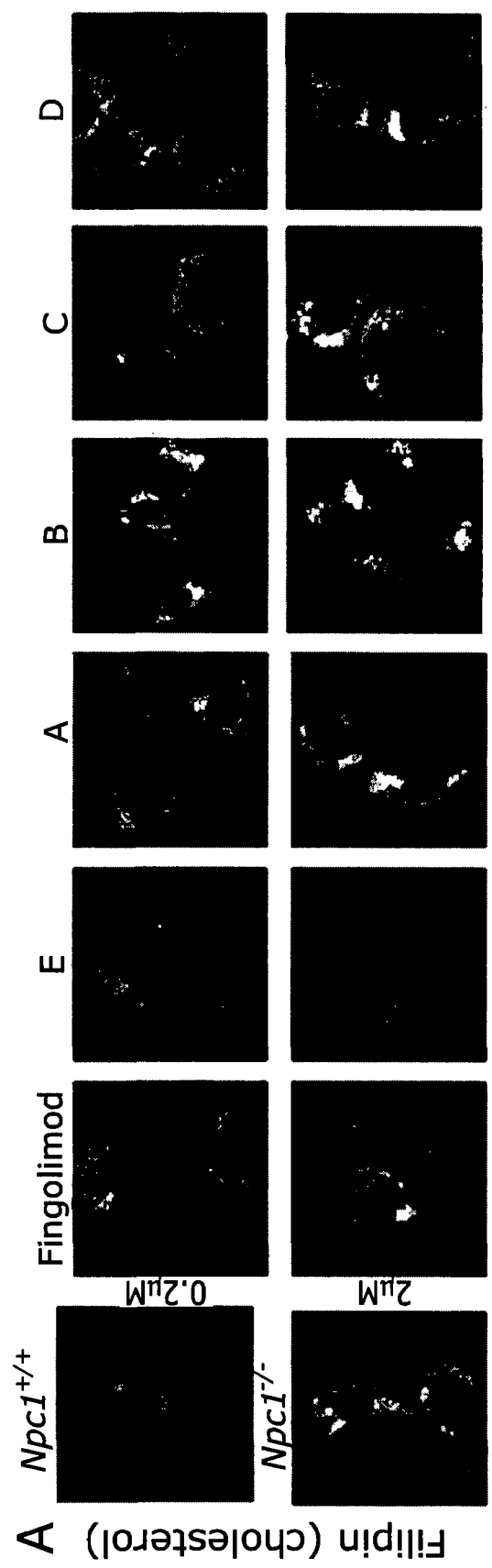
Figure 6:
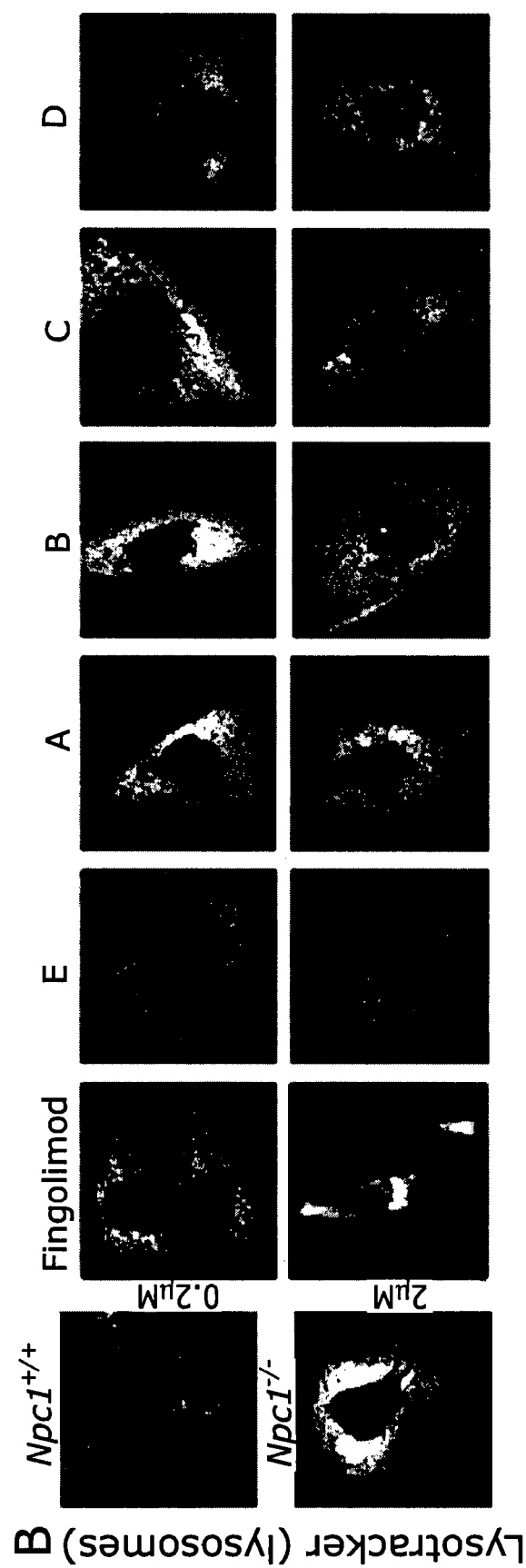
Figure 6:
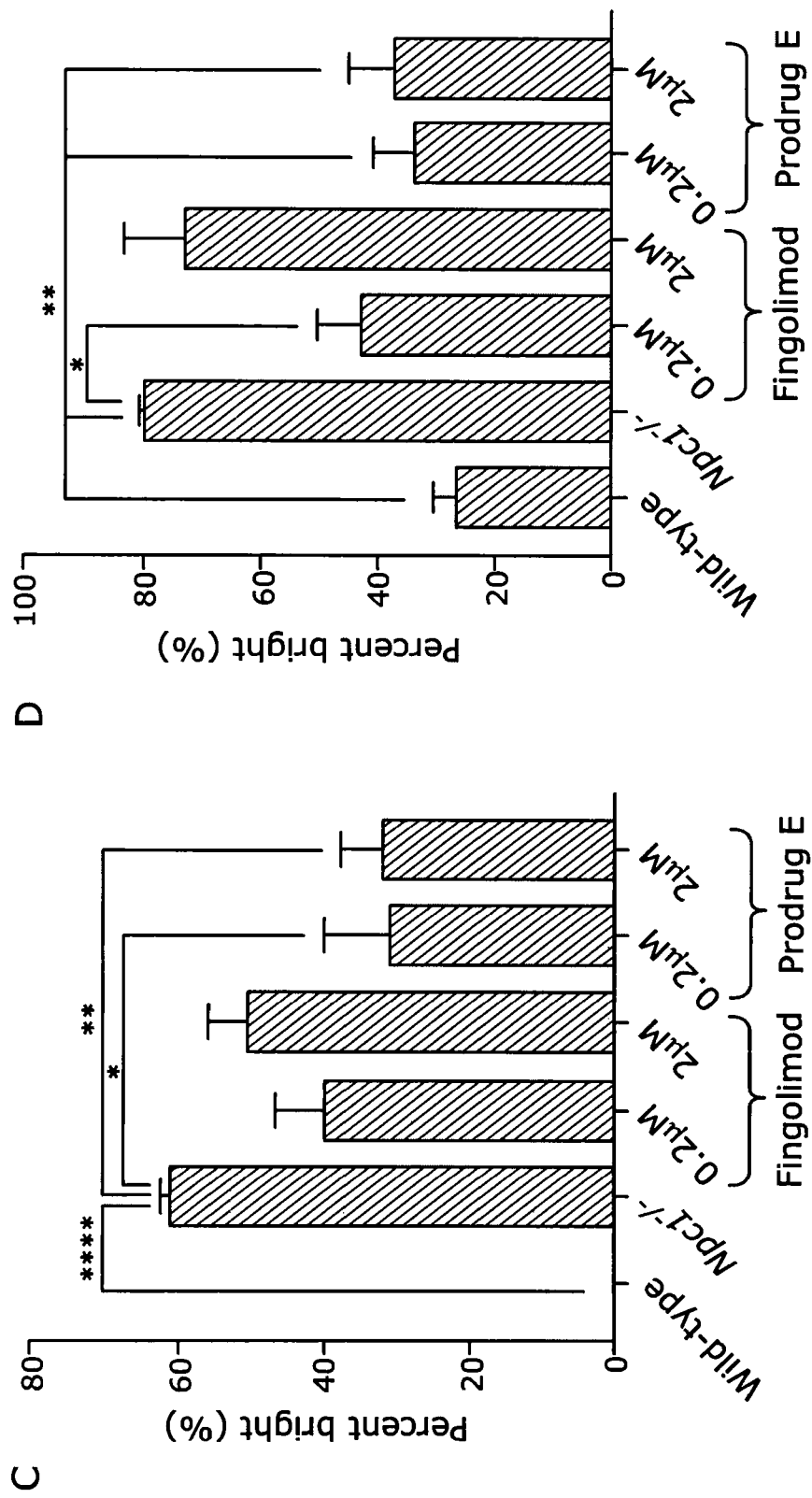

FIG. 6: shows the effect of fingolimod prodrugs on Npc1$^{-/-}$ lysosomal expansion and cholesterol storage phenotypes. Npc1$^{-/-}$ human fibroblasts were treated for ~12 hours with 0.2 or 2 μM of either fingolimod or prodrugs A, B, C, D, E (see methods for information on prodrug structures) prior to staining with either filipin for cholesterol (A) or lysotracker green for lysosomes (B) and comparison with Npc1$^{+/+}$ fibroblasts. Images were quantified to generate graphs shown (C=filipin & D=lysotracker). N=4 for filipin, N=3 for lysotracker. **=p<0.0001, =p<0.01, *=p<0.05.

DETAILED DESCRIPTION

Materials and Methods

General Procedures

All experiments involving water-sensitive compounds were conducted under scrupulously dry conditions. Anhydrous tetrahydrofuran (THF) and dichloromethane were purchased from Aldrich and used directly. Column chromatography refers to flash column chromatography carried out using Merck silica gel 60 (40-60 μm) as stationary phase. Proton, carbon, and phosphorus nuclear magnetic resonance ($^1$H, $^{13}$C, $^{31}$P NMR) spectra were recorded on Bruker Avance spectrometers operating either at 500, 125, and 202 MHz. The solvents used are indicated for each compound. All $^{13}$C and $^{31}$P spectra were recorded proton decoupled. Chemical shifts for $^1$H and $^{13}$C spectra are in parts per million downfield from tetramethylsilane. Coupling constants are referred to as J values. Signal splitting patterns are described as singlet (s), doublet (d), triplet (t), quartet (q), broad signal (br), doublet of doublet (dd), doublet of triplet (dt), or multiplet (m). Chemical shifts for 31P spectra are in parts per million relative to an external phosphoric acid standard. Some of the proton and carbon NMR signals were splitted because of the presence of (phosphate) diastereoisomers in the samples. Electrospray mass spectra were obtained using a Bruker MicroTOF coupled to an Agilent 1100 HPLC system. The electrospray source was operated at a temperature of 130° C. with a desolvation temperature of 300° C., a capillary voltage of 3 kV, and cone voltage of 30 V. Data were collected in the continuum mode over the mass range 100-2000 amu. Analytical HPLC was performed on a Thermo Fisher Spectra system 4000 using a RP C-18 column Varian Pursuit, 150 mm×4.6 mm, 5.0 μm with detection wavelength was 220 nm Mobile phases: Eluent A=H$_2$O (+0.1% HClO$_4$), Eluent B=Acetonitrile, gradient [time (min.)/% eluent B]: (0/50, 20/85, 22/85, 24/00, 25/100, 28/50), flow rate: 0.8 mL/min.

Synthesis of 1-naphthyl Dichlorophosphate

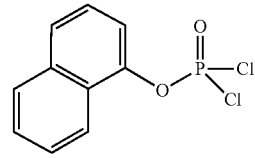 [SMILES: O=P(Cl)(Cl)Oc1cccc2ccccc12]

Phosphorus oxychloride (2.59 ml, 27.74 mmol, 1 eq) and 1-naphthol (4 g, 27.74 mmol, 1 eq) were stirred in anhydrous Et$_2$O under an argon atmosphere. Anhydrous Et$_3$N was added (3.87 ml, 27.74 mmol, 1 eq) at −78° C. After 30 minutes the solution was allowed to warm to room temperature. After 3.5 hours after checking the disappear of starting material peak and concomitant formation of the desired products peak by $^{31}$P NMR, the mixture was subjected to vacuum filtration. The solid salt mixture was discarded and Et$_2$O solvent was removed from the solution in vacuo yielding the yellow oil product in 72% yield (5.18 g). C$_{10}$H$_7$Cl$_2$O$_6$P; M. W: 260.0; $^1$H NMR (CDCl$_3$, 500 MHz): δ8.13-7.37 (7H, m, ArH); $^{31}$P NMR (CDCl$_3$, 202 MHz): δ3.73.

Phosphorochloridate Synthesis Standard Procedure

To a stirred solution of the appropriate amino acid ester salt (1 equivalent) and the appropriate aryl dichlorophosphate (1 equivalent) in anhydrous CH$_2$Cl$_2$ was added dropwise at −78° C. anhydrous Et$_3$N (2 equivalents). Following the addition, the reaction mixture was stirred at −78° C. for 30 min and then at room temperature for 1 h. Formation of the desired compound and disappearance of the starting material was monitored by $^{31}$PNMR. After this period the solvent was removed under reduced pressure to give an oil.

Most of the aryl phosphorochloridates synthesised were purified by flash column chromatography on silica gel (eluting with hexane-ethyl acetate 70:30 v/v).

Synthesis of Phenylbenzyloxy-L-leucinyl) Phosphorochioridate

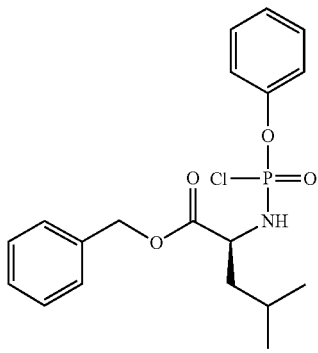 [SMILES: CC(C)C[C@H](NP(=O)(Cl)Oc1ccccc1)C(=O)OCc1ccccc1]

To a stirred solution of L-leucine benzyl ester p-tosylate (3.34 g. 8.5 mmol, 1 eq) and phenyl dichlorophosphate (1.27 ml, 8.5 mmol, 1 eq) in anhydrous $CH_2Cl_2$ (20 ml) was added dropwise at −78° C. anhydrous $Et_3N$ (2.37 ml, 17 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 42% yield (1.41 g). $C_{19}H_{23}ClNO_4P$; M. W: 395.1; $^{31}$P NMR ($CDCl_3$, 202 MHz): δ8.45, 8.15.

Synthesis of Phenyl-(benzyloxy-L-prolinyl) Phosphorochioridate

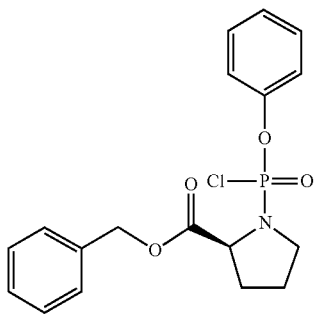 [SMILES: O=C(OCc1ccccc1)[C@@H]1CCCN1P(=O)(Cl)Oc1ccccc1]

To a stirred solution of L-Proline benzyl ester hydrochloride (2.05 g. 8.5 mmol, 1 eq) and phenyl dichlorophosphate (1.27 ml, 8.5 mmol, 1 eq) in anhydrous $CH_2Cl_2$ (20 ml) was added dropwise at −78° C. anhydrous $Et_3N$ (2.37 ml, 17 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 72% yield (2.33 g). $C_{18}H_{19}ClNO_4P$; M. W: 379.1; $^1$H NMR ($CDCl_3$, 500 MHz): δ7.38-7.16 (10H, m, ArH), 5.16 (2H, m, OCH$_2$Ph), 4.55 (1H, m, CHNP), 3.51 (2H, m, CH$_2$NP), 2.21 (2H, m, CHCH$_2$CH$_2$), 1.96 (2H, m, CHCH$_2$CH$_2$); $^{31}$P NMR (CDCl$_3$, 202 MHz): δ7.74, 7.67.

Synthesis of Phenyl-(ethoxy-L-alaninyl) Phosphorochioridate

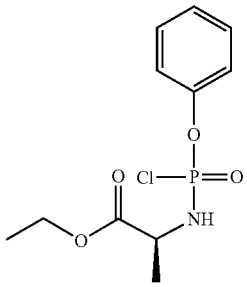 [SMILES: CCOC(=O)[C@H](C)NP(=O)(Cl)Oc1ccccc1]

To a stirred solution of L-Alanine ethyl ester hydrochloride (1.31 g. 8.5 mmol, 1 eq) and phenyl dichlorophosphate (1.27 ml, 8.5 mmol, 1 eq) in anhydrous $CH_2Cl_2$ (20 ml) was added dropwise at −78° C. anhydrous $Et_3N$ (2.37 ml, 17 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 84% yield (2.1 g). $C_{11}H_{15}ClNO_4P$; M. W: 291.0; $^1$H NMR (CDCl$_3$, 500 MHz): δ7.36-7.21 (5H, m, ArH), 4.38 (1H, m, CHCH$_3$), 4.22 (2H, m, OCH$_2$CH$_3$), 1.52 (3H, m, CH$_2$CH$_3$), 1.25 (3H, m, CHCH$_3$); $^{31}$P NMR (CDCl$_3$, 202 MHz): δ8.02, 7.70.

Synthesis of 1-Naphthylethoxy-L-alaninyl) Phosphorochioridate

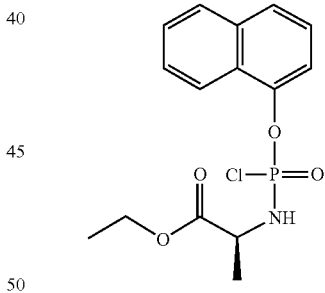

To a stirred solution of L-Alanine ethyl ester hydrochloride (1.31 g. 8.5 mmol, 1 eq) and 1-naphthyl dichlorophosphate (1.51 ml, 8.5 mmol, 1 eq) in anhydrous $CH_2Cl_2$ (20 ml) was added dropwise at −78° C. anhydrous $Et_3N$ (2.37 ml, 17 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 64% yield (1.87 g). $C_{15}H_{17}ClNO_4P$ MW: 341.0 $^1$H NMR (CDCl$_3$, 500 MHz): δ8.19-7.22 (7H, m, ArH), 4.52 (1H, m, CHCH$_3$), 4.22 (2H, m, OCH$_2$CH$_3$), 1.52 (3H, m, CH$_2$CH$_3$), 1.25 (3H, m, CHCH$_3$); $^{31}$P NMR (CDCl$_3$, 202 MHz): δ8.28, 8.00.

Phenyl-(methoxy-L-methioninyl) Phosphorochloridate

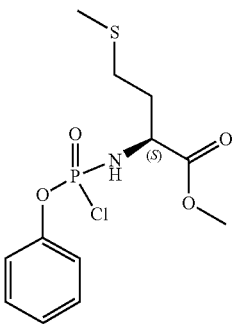

To a stirred solution of L-methionine methyl ester hydrochloride (3.0 g. 14.10 mmol, 1 eq) and phenyl dichlorophosphate (2.11 ml, 14.10 mmol, 1 eq) in anhydrous $CH_2Cl_2$ (100 ml) was added dropwise at −78° C. anhydrous $Et_3N$ (3.94 ml, 28.21 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 80% yield (4.00 g). $C_{13}H_{19}ClNO_4P$; M. W: 351.79; $^1$H NMR ($CDCl_3$, 500 MHz): δ7.42-7.35 (m, 2H, ArH), 7.33-7.23 (m, 3H, ArH), 4.64 (t, J=10.4 Hz, 2H, CHNH), 4.30-4.26 (m, 2H, $CH_2CH_3$), 2.70-2.54 (m, 2H, $CHCH_2$), 2.24–2.13 (m, 2H, $CH_2S$), 2.10 (s, 3H, $SCH_3$), 1.32 (t, J=7.1 Hz, 2H, $CH_2CH_3$); $^{31}$P NMR ($CDCl_3$, 202 MHz): 8.49, 8.36.

Phenyl-(methoxy—O—tert-butyl-L-tyrosinyl) Phosphorochloridate

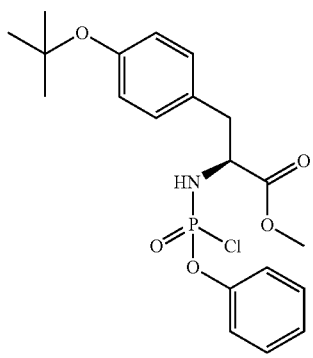 [SMILES: COC(=O)[C@H](Cc1ccc(OC(C)(C)C)cc1)NP(=O)(Cl)Oc1ccccc1]

To a stirred solution of O-tert-butyl L-tyrosine methyl ester hydrochloride (3.0 g. 10.42 mmol, 1 eq) and phenyl dichlorophosphate (1.56 ml, 10.42 mmol, 1 eq) in anhydrous $CH_2Cl_2$ (100 ml) was added dropwise at −78° C. anhydrous $Et_3N$ (2.91 ml, 20.85 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 67% yield (2.98 g). $C_{20}H_{25}ClNO_5P$; M. W: 425.84; $^1$H NMR (500 MHz, $CDCl_3$) δ7.42-7.36 (m, 2H, ArH), 7.25 (m, 3H, ArH), 7.08 (d, J=8.5 Hz, 1H, ArH), 7.04 (d, J=8.5 Hz, 1H, ArH), 6.96-6.92 (m, 2H, ArH), 4.50-4.32 (m, 1H, CHNH), 4.24-4.07 (m, 1H, CHNH), 3.75 (s, 1H, OMe), 3.73 (s, 1H, OMe), 3.17-3.09 (m, 2H), 1.35 (s, 5H), 1.33 (s, 4H); $^{31}$P NMR (202 MHz, $CDCl_3$) δ7.90, 7.87.

Phenyl-(dimethoxy-L-glutamyl) Phosphorochloridate

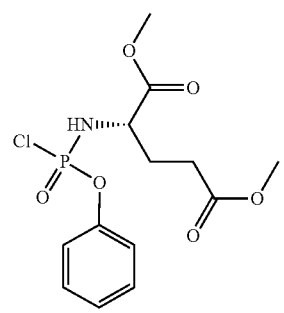 [SMILES: COC(=O)CC[C@H](NP(=O)(Cl)Oc1ccccc1)C(=O)OC]

To a stirred solution of L-glutamic acid dimethyl ester hydrochloride (3.0 g. 12.52 mmol, 1 eq) and phenyl dichlorophosphate (1.87 ml, 12.52 mmol, 1 eq) in anhydrous $CH_2Cl_2$ (100 ml) was added dropwise at −78° C. anhydrous $Et_3N$ (3.40 ml, 25.03 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 76% yield (3.59 g). $C_{15}H_{21}ClNO_6P$; M. W: 377.76; $^1$H NMR (500 MHz, $CDCl_3$) δ7.42-7.37 (m, 2H, ArH), 7.30-7.26 (m, 3H, ArH), 4.50-4.39 (m, 1H, CHNH), 4.31-4.18 (m, 1H, CHNH), 3.83 (s, 1H, $OCH_3$), 3.81 (s, 1.5H, $OCH_3$), 3.70 (s, 1.5H, $OCH_3$), 3.67 (s, 1.5H, $OCH_3$), 2.64-2.35 (m, 2H, $CH_2CO_2Me$), 2.32-2.22 (m, 1H, $CHCH_2$), 2.13-2.00 (m, 1H, $CHCH_2$); $^{31}$P NMR (202 MHz, $CDCl_3$) δ8.34, 8.24.

Phenyl-(methoxy-L-tryptophanyl) Phosphorochloridate

FG-33-tryptophan

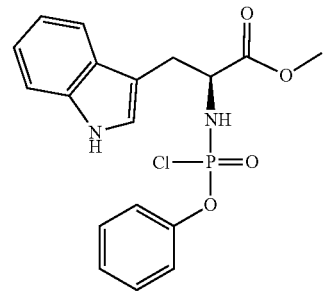 [SMILES: COC(=O)[C@H](Cc1c[nH]c2ccccc12)NP(=O)(Cl)Oc1ccccc1]

To a stirred solution of L-Tryptophane methyl ester hydrochloride (2.0 g. 7.85 mmol, 1 eq) and phenyl dichlorophosphate (1.17 ml, 7.85 mmol, 1 eq) in anhydrous CH$_2$Cl$_2$ (100 ml) was added dropwise at −78° C. anhydrous Et$_3$N (2.13 ml, 15.70 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 72% yield (2.24 g). C$_{18}$H$_{18}$ClN$_2$O$_4$P; M. W: 392.77; $^1$H NMR (CDCl$_3$, 500 MHz) δ8.11 (s, 1H, NH), 7.51-7.44 (m, 1H, ArH), 7.32-7.20 (m, 3H, ArH), 7.19 (s, 1H, ArH), 7.17-6.97 (m, 4H, ArH), 4.51-4.30 (m, 1H, CHNH), 4.24-4.05 (m, 1H, CHNH), 3.61 (s, 3H, OCH$_3$), 3.60 (s, 3H, OCH$_3$), 3.34-3.21 (m, 2H, CH$_2$); $^{31}$P NMR (202 MHz, CDCl$_3$) δ8.08, 7.99.

Phenyl-(methoxy—O—tert-butyl-L-threoninyl) Phosphorochloridate

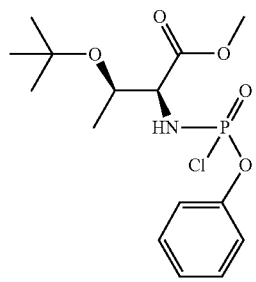 [SMILES: COC(=O)[C@@H](NP(=O)(Cl)Oc1ccccc1)[C@@H](C)OC(C)(C)C]

To a stirred solution of O-tert-butyl L-Threonine methyl ester hydrochloride (2.0 g. 8.86 mmol, 1 eq) and phenyl dichlorophosphate (1.32 ml, 8.86 mmol, 1 eq) in anhydrous CH$_2$Cl$_2$ (100 ml) was added dropwise at −78° C. anhydrous Et$_3$N (2.41 ml, 17.72 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 96% yield (3.10 g). C$_{15}$H$_{23}$ClNO$_5$P; M. W: 363.77; $^1$H NMR (CDCl$_3$, 500 MHz) δ7.40-7.35 (m, 2H, Ph), 7.31-7.26 (m, 2H, Ph), 7.26-7.21 (m, 1H, Ph), 4.45 (m, 1H, NH), 4.20 (m, 1H, CH$_3$CH), 3.97 (m, 1H, CHNH), 3.76 (s, 1.5H, OCH$_3$), 3.74 (s, 1.5H, OCH$_3$), 1.29 (d, J=6.2 Hz, 1.5H, CH$_3$), 1.27 (d, J=6.2 Hz, 1.5H, CH$_3$), 1.12 (s, 9H, C(CH$_3$)$_3$); $^{31}$P NMR (CDCl$_3$, 202 MHz) δ9.71, 8.98.

Phenyl-(methoxy-N-Boc-L-lysinyl) Phosphorochloridate

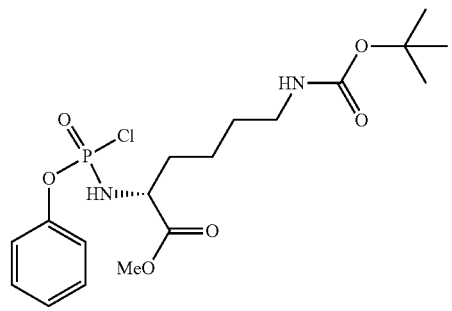 [SMILES: COC(=O)[C@@H](CCCCNC(=O)OC(C)(C)C)NP(=O)(Cl)Oc1ccccc1]

To a stirred solution of N-Boc-L-lysine methyl ester hydrochloride (2.2 g. 7.41 mmol, 1 eq) and phenyl dichlorophosphate (1.11 ml, 7.41 mmol, 1 eq) in anhydrous CH$_2$Cl$_2$ (100 ml) was added dropwise at −78° C. anhydrous Et$_3$N (2.01 ml, 14.83 mmol, 2 eq). Following the addition, the reaction mixture was stirred at −78° C. for 30 min and then at room temperature for 1 h. Formation of the desired compound was monitored by $^{31}$PNMR. After this period the solvent was removed under reduced pressure to give an oil. The product was then purified by flash column chromatography (eluting with hexane-ethyl acetate 70:30 v/v) giving the desired compound in 89% yield (2.88 g). C$_{18}$H$_{28}$ClN$_2$O$_6$P; M. W: 674.81; $^1$H NMR (500 MHz, CDCl$_3$) δ7.43-7.37 (m, 2H, ArH), 7.31-7.25 (m, 3H, ArH), 4.59 (d, J=27.6 Hz, 1H, CHNH), 4.41-4.27 (m, 1H, CH$_{2a}$NHBOC), 4.23-4.05 (m, 1H, CH$_{2b}$NHBOC), 3.82 (s, 3H, OCH$_3$), 3.78 (s, 3H, OCH$_3$), 3.12 (d, J=6.6 Hz, 2H, CH$_2$CHNHP), 1.90 (m, 1H, CH$_2$), 1.85-1.73 (m, 1H, CH$_2$), 1.57-1.48 (m, 1H, CH$_2$), 1.48 (s, 9H, C(CH$_3$)$_3$); $^{31}$P NMR (202 MHz, CDCl$_3$) δ8.40, 8.28.

Phosphoramidate Synthesis Using tBuMgCl Standard Procedure tBuMgCl (1 equivalent) was added dropwise to a solution of primary alcohol (e.g. fingolimod hydrochloride/1-(4-{[(2S)-2-Amino-3-hydroxy-2-methyl-propoxy]methyl}phenyl)-4-(4-methylphenyl)butan-1-one) (1 equivalent) in anhydrous THF (7 ml) under anhydrous conditions. The mixture was stirred at room temperature for one hour. After this time the appropriate phosphorochloridate (1 equivalent) in anhydrous THF (2 ml) was added dropwise to the stirring reaction mixture. The reaction was left to stir for 24 hours and then the solvent was removed in vacuo and the desired product was dry-loaded to a column and isolated using flash chromatography (eluting with methanol-dichloromethane 0:100 v/v increasing to 10:90 v/v).

EXAMPLE 1

Synthesis of (2S)-methyl 2-(((2-amino-2-(hydroxymethyl)-4-(4-octylphenyl)butoxy)(phenoxy)phosphoryl)amino)propanoate [Phenyl-(methyloxy-L-alaninyl) Phosphoramidate Fingolimod]

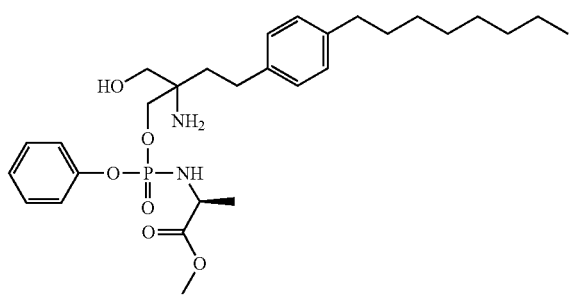 [SMILES: CCCCCCCCc1ccc(CCC(N)(CO)COP(=O)(N[C@@H](C)C(=O)OC)Oc2ccccc2)cc1]

tBuMgCl (1.45 ml, 1 equivalent) was added dropwise to a solution of fingolimod hydrochloride (500 mg, 1.45 mmol, 1 equivalent) in anhydrous THF (7 ml) under anhydrous conditions. The mixture was stirred at room temperature for one hour. After this time Phenyl-(methyloxy-L-alaninyl) phosphorochloridate (403 mg, 1.45 mmol, 1 equivalent) in anhydrous THF (2.6 ml) was added dropwise to the stirring reaction mixture. The reaction was left to stir for 24 hour and then the solvent was removed in vacuo and the desired product was isolated using flash chromatography (methanol-dichloromethane 0:100 v/v increasing to 10:90 v/v) giving the desired compound as a mixture of four diastereoisomers in 44% yield (0.35 g). $C_{25}H_{45}N_2O_6P$; M. W: 548.3; $^1$H NMR (CDCl$_3$, 500 MHz): δ7.29-7.02 (9H, m, ArH), 5.19 (1H, m, CHNH), 4.39 (3H, m, OCH$_3$), 4.18 (1H, m, CHCH$_3$), 3.81 (2H, m, POCH$_2$), 3.61 (2H, m, CH$_2$OH), 2.64 (2H, m, CH$_2$CH$_2$Ph), 2.54 (2H, m, CH$_2$C$_7$H$_{15}$), 2.05 (2H, m, CH$_2$CH$_2$Ph), 1.61 (2H, m, CH$_2$C$_6$H$_{13}$), 1.42 (1.5H, m, CHCH$_3$), 1.41 (1.5H, m, CHCH$_3$), 1.33-1.27 (10H, m, 5× CH$_2$ C$_5$H$_{10}$CH$_3$), 0.81 (3H, m, CH$_3$). $^{31}$P NMR (CDCl$_3$, 202 MHz): δ3.60, 3.47, 3.14, 3.06. MS [ES+] m/z 549.3 [M+H]$^+$.

EXAMPLE 2

Synthesis of Benzyl 2-(((2-amino-2(hydroxymethyl)-4-(4-octylphenyl)butoxy)(phenoxy)phosphoryl)amino)acetate [Phenyl-(benzyloxy-glycinyl) Phosphoramidate Fingolimod]

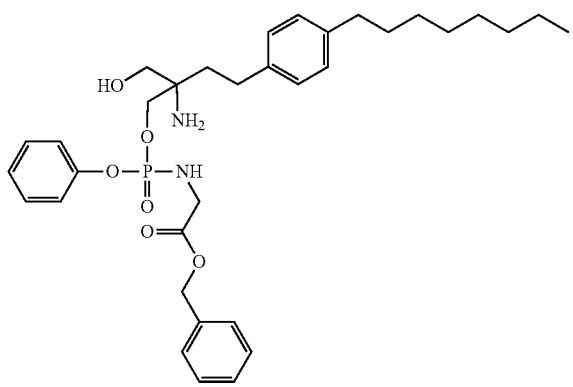 [SMILES: CCCCCCCCc1ccc(CCC(N)(CO)COP(=O)(NCC(=O)OCc2ccccc2)Oc2ccccc2)cc1]

tBuMgCl (1.45 ml, 1 equivalent) was added dropwise to a solution of fingolimod hydrochloride (500 mg, 1.45 mmol, 1 equivalent) in anhydrous THF (7 ml) under anhydrous conditions. The mixture was stirred at room temperature for one hour. After this time Phenyl-(benzyloxy-glycinyl) phosphorochloridate (493 mg, 1.45 mmol, 1 equivalent) in anhydrous THF (2.75 ml) was added dropwise to the stirring reaction mixture. The reaction was left to stir for 24 hours and then the solvent was removed in vacuo and the desired product was isolated using flash chromatography (methanol-dichloromethane 0:100 v/v increasing to 10:90 v/v) giving the desired compound as a mixture of two diastereoisomers in 17% yield (0.15 g). $C_{34}H_{47}N_2O_6P$; M. W: 610.3; $^1$H NMR (CDCl$_3$, 500 MHz): δ7.32-6.98 (14H, m, ArH), 5.26 (2H, m, OCH$_2$Ph), 5.19 (1H, m, CHNH), 4.22 (2H, m, CH$_2$NH), 3.81 (2H, m, POCH$_2$), 3.72 (2H, m, CH$_2$OH), 2.64 (2H, m, CH$_2$CH$_2$Ph), 2.54 (2H, m, CH$_2$C$_7$H$_{15}$), 2.05 (2H, m, CH$_2$CH$_2$Ph), 1.61 (2H, m, CH$_2$C$_6$H$_{13}$), 1.42 (3H, m, CHCH$_3$), 1.33-1.27 (10H, m, 5× CH$_2$, C$_5$H$_{10}$CH$_3$), 0.81 (3H, m CH$_3$). $^{31}$P NMR (CDCl$_3$, 202 MHz): δ4.27, 3.99; MS [ES+] m/z 611.3 [M+H]$^+$.

EXAMPLE 3

Synthesis of (2S) benzyl-2-(((2-amino-2-(hydroxymethyl)-4-(4-octylphenyl)butoxy)(phenoxy)phosphoryl)amino)-4-methylpentanoate [Phenyl-(benzyloxy-L-leucinyl) Phosphoramidate Fingolimod]

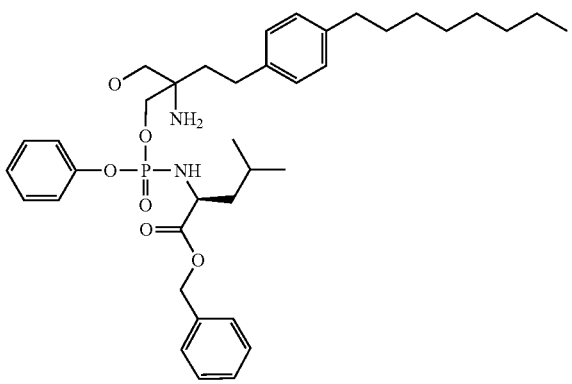 [SMILES: CCCCCCCCc1ccc(CCC(N)(CO)COP(=O)(N[C@@H](CC(C)C)C(=O)OCc2ccccc2)Oc2ccccc2)cc1]

tBuMgCl (1.45 ml, 1 equivalent) was added dropwise to a solution of fingolimod hydrochloride (500 mg, 1.45 mmol, 1 equivalent) in anhydrous THF (5 ml) under anhydrous conditions. The mixture was stirred at room temperature for one hour. After one hour the Phenyl-(benzyloxy-L-leucinyl) phosphorochloridate (574 mg, 1.45 mmol, 1 equivalent) in anhydrous THF (3.2 ml) was added dropwise to the stirring reaction mixture. The reaction was left to stir for 24 hours. After 24 hours the solvent was removed in vacuo and the desired product was isolated using flash chromatography (methanol-dichloromethane 0:100 v/v increasing to 10:90 v/v) giving the desired compound as a mixture of four diastereoisomers in 23%, yield (0.22 g). $C_{38}H_{55}N_2O_6P$; M. W: 666.4; $^1$H NMR (CDCl$_3$, 500 MHz): δ7.28-6.29 (14H, m, ArH), 4.96 (2H, m, OCH$_2$Ph), 4.39 (2H, m, NH$_2$), 4.13 (2H, m, POCH$_2$), 3.91 (1H, m, CHCH$_3$), 4.02 (1H, m, CHCH$_3$), 3.42 (2H, m, CH$_2$OH), 2.52 (2H, m, CH$_2$CH$_2$Ph), 2.48 (2H, m, CH$_2$C$_7$H$_{15}$), 1.71 (2H, m, CH$_2$CH$_2$Ph), 1.48 (2H, m, CCH$_2$CH), 1.40 (2H, m, CH$_2$C$_6$H$_{13}$), 1.22-1.17 (10H, m, 5× CH$_2$, C$_5$H$_{10}$CH$_3$), 0.82 (3H, m, CHCH$_3$), 0.81

(3H, m, CH₃), 0.75 (3H, m, CHCH₃). ³¹P NMR (CDCl₃, 202 MHz): δ4.66, 4.46, 4.20, 3.95; MS [ES+] m/z 667.4 [M+H]⁺.

EXAMPLE 4

Synthesis of (2S) benzyl-1-((2-amino-2-(hydroxymethyl)-4-(4-octylphenyl)butoxy)(phenoxy)phosphoryl)pyrrolidine-2-carboxylate [Phenyl-(benzyloxy-L-prolinyl) Phosphoramidate Fingolimod]

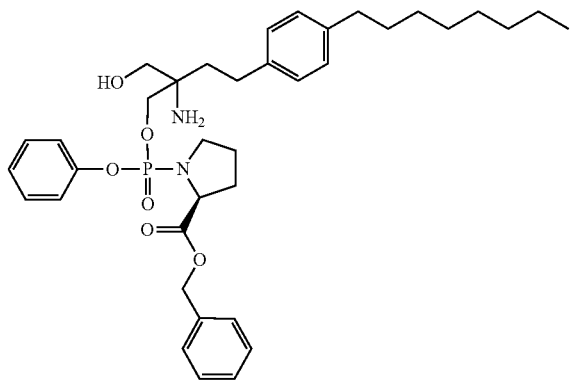 [SMILES: CCCCCCCCc1ccc(CCC(N)(CO)COP(=O)(Oc2ccccc2)N2CCC[C@H]2C(=O)OCc2ccccc2)cc1]

tBuMgCl (1.45 ml, 1 equivalent) was added dropwise to a solution of fingolimod hydrochloride (500 mg, 1.45 mmol, 1 equivalent) in anhydrous THF (5 ml) under anhydrous conditions. The mixture was stirred at room temperature for one hour. After one hour Phenyl-(benzyloxy-L-prolinyl) phosphorochloridate (551 mg, 1.45 mmol, 1 equivalent) in anhydrous THF (4.5 ml) was added dropwise to the stirring reaction mixture. The reaction was left to stir for 24 hours. After 24 hours the solvent was removed in vacuo and the desired product was isolated using flash chromatography (methanol-dichloromethane 0:100 v/v increasing to 10:90 v/v) giving the desired compound as a mixture of four diastereoisomers in 20% yield (0.19 g). $C_{37}H_{51}N_2O_6P$; M. W: 650.4; ¹H NMR (CDCl₃, 500 MHz): 7.32-6.98 (14H, m, ArH), 5.16 (2H, m, OCH₂Ph), 4.55 (1H, m, CHN), 3.81 (2H, m, POCH₂), 3.61 (2H, m, CH₂OH), 3.51 (2H, m, CH₂NP), 2.64 (2H, m, CH₂CH₂Ph), 2.54 (2H, m, CH₂C₇H₁₃), 2.21 (2H, m, CH₂CH₂Ph), 2.05 (2H, m, CH₂CH₂Ph), 1.96 (2H, m, CHCH₂CH₂), 1.61 (2H, m, CH₂CH₂CH₂), 1.42 (3H, m, CHCH₃), 1.33-1.27 (10H, m, 5× CH₂ C₅H₁₀CH₃); ³¹P NMR (CDCl₃, 202 MHz): 2.99, 2.94. MS [ES+] m/z 651.4 [M+H]⁺.

EXAMPLE 5

Synthesis of (2S) ethyl-2-(((2-amino-2-(hydroxymethyl)-4-(4-octylphenyl)butoxy)(phenoxy)phosphoryl)amino)-propanoate [Phenyl-(ethoxy-L-alaninyl)Phosphoramidate Fingolimod]

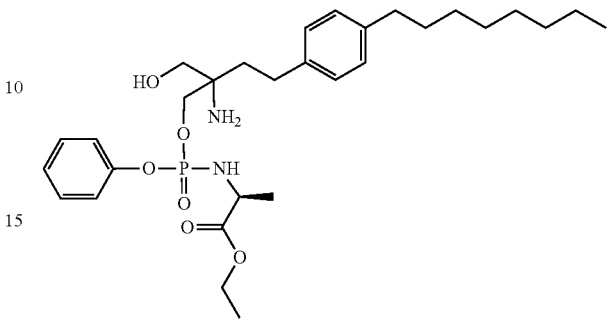

tBuMgCl (1.45 ml, 1 equivalent) was added dropwise to a solution of fingolimod hydrochloride (500 mg, 1.45 mmol, 1 equivalent) in anhydrous THF (5 ml) under anhydrous conditions. The mixture was stirred at room temperature for one hour. After one hour the Phenyl-(ethoxy-L-alaninyl) phosphorochloridate (423 mg, 1.45 mmol, 1 equivalent) in anhydrous THF (2.8 ml) was added dropwise to the stirring reaction mixture. The reaction was left to stir for 24 hours. After 24 hours the solvent was removed in vacuo and the desired product was isolated using flash chromatography (methanol-dichloromethane 0:100 v/v increasing to 10:90 v/v) giving the desired compound as a mixture of four diastereoisomers in 20%, yield (0.16 g). $C_{30}H_{47}N_2O_6P$; M. W: 562.3; ¹H NMR (CDCl₃, 500 MHz): δ7.36-7.05 (9H, m, ArH), 4.22 (3H, m, OCH₂CH₃), 4.05 (2H, m, OCH₂C), 3.65 (1H, m, CHCH₃), 3.45 (2H, m, HOCH₂C), 2.61 (2H, m, CH₂CH₂Ph), 2.58 (2H, m, CH₂CH₂Ph), 1.71 (2H, m, CCH₂CH₂), 1.65 (2H, m, CH₂CH₂CH₂), 1.45 (3H, m, CHCH₃), 1.38 (2H, m, CH₂CH₂CH₂), 1.37 (2H, m, CH₂CH₂CH₂), 1.36 (2H, m, CH₂CH₂CH₂), 1.29 (2H, m, CH₂CH₂CH₂), 1.27 (2H, m, CH₂CH₂CH₂), 1.22 (3H, m, CHCH₃), 0.98 (3H, m, CH₂CH₃). ³¹P NMR (CDCl₃, 202 MHz): δ4.05, 3.84, 3.73, 3.59. MS [ES+] m/z 563.3 [M+H]⁺.

EXAMPLE 6

Synthesis of (2R)-benzyl 2-(((2-amino-2-(hydroxymethyl)-4-(4-octylphenyl)butoxy)(naphthalen-1-yloxy)phosphoryl) amino) Propanoate

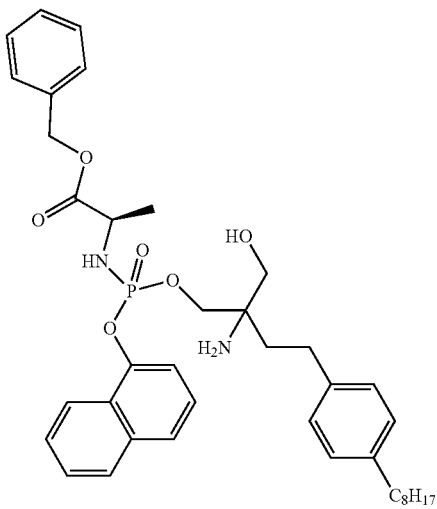

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Naphthyl-(benzyloxy-L-Alaninyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 26% yield (0.1 g) as a mixture of four diastereoisomers using flash chromatography on a Biotage Isolera, eluting with $CH_3OH/CH_2Cl_2$ 0:100 v/v increasing to 10:90 v/v). ($R_f$=0.28, $CH_2Cl_2$/ $CH_3OH$ 95:5 v/v); $C_{39}H_{51}N_2O_6P$; M. W: 674.81; $^1H$ NMR ($CDCl_3$, 500 MHz) δ8.07-7.98 (m, 1H, Naph), 7.80-7.68 (m, 1H, Naph), 7.55 (d, J=8.2 Hz, 1H, Naph) 7.41-7.39 (m, 3H, ArH), 7.26-7.17 (m, 6H, ArH), 7.09-6.87 (m, 2H, ArH), 6.83 (m, 2H, ArH), 5.30-4.83 (m, 2H, $CH_2OBn$), 4.23-4.16 (1H, m, $CHCH_3$) 4.02-3.85 (m, 2H, $POCH_2$), 3.58-3.19 (m, 2H, $CH_2OH$), 2.53-2.31 (m, 4H, $CH_2C_7H_{15}$, $CH_2CH_2Ph$), 1.59-1.41 (m, 4H, $CH_2CH_2Ph$, $CH_2C_6H_{13}$), 1.39-1.29 (m, 3H, $CHCH_3$), 1.28-1.13 (m, 10H, 5× $CH_2$, $C_5H_{10}CH_3$), 0.80 (m, 3H, $CH_3$). $^{31}P$ NMR ($CDCl_3$, 202 MHz) δ4.59, 4.36, 4.29, 4.12; $^{13}C$ NMR ($CDCl_3$, 125 MHz) (several signals overlaps) δ173.61, 173.56, 173.45, 173.40, 146.46, 140.51, 140.49, 138.64, 138.58, 135.17, 135.15, 134.74, 128.66, 128.59, 128.51, 128.44, 128.39, 128.30, 128.18, 128.11, 127.86, 127.81, 125.66, 125.52, 125.52, 125.15, 125.11, 125.10, 121.60, 121.46, 115.79, 115.65, 77.31, 77.05, 76.80, 68.68, 68.63, 68.48, 67.34, 67.32, 65.52, 64.74, 64.67, 50.50, 36.86, 35.56, 35.45, 31.95, 31.93, 31.91, 31.61, 31.59, 31.58, 29.72, 29.52, 29.50, 29.41, 29.39, 29.37, 29.31, 29.29, 29.06, 28.61, 28.56, 28.54, 22.70, 20.82, 14.14; MS [ES+] m/z 675 [M+H]$^+$, HPLC r.t. 14.1, 14.5, 15.24, 15.80 min.

EXAMPLE 7

Synthesis of (2R)-neopentyl 2-(((2-amino-2-(hydroxymethyl)-4-(4-octylphenyl)butoxy)(naphthalen-1-yloxy)phosphoryl)amino) Propanoate (Prodrug D)

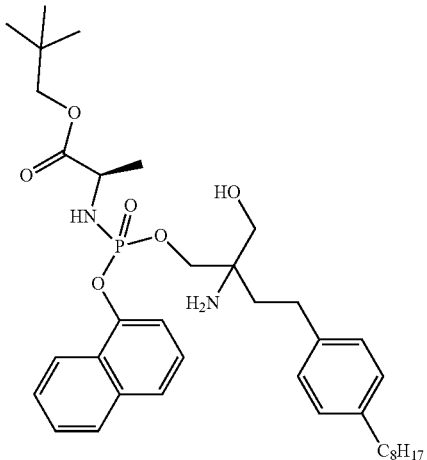

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Naphthyl-(neopentyloxy-L-Alaninyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 29% yield (110 mg) as a mixture of four diastereoisomers using flash chromatography on a Biotage Isolera, eluting with $CH_3OH/CH_2Cl_2$ 0:100 v/v increasing to 10:90 v/v). ($R_f$=0.28, $CH_2Cl_2$/ $CH_3OH$ 95:5 v/v). Many signals overlap in $^1H$, $^{13}C$ spectra. $C_{37}H_{55}N_2O_6P$; M. W: 654.81; $^1H$ NMR ($CDCl_3$, 500 MHz) δ8.05-8.03 (m, 1H, Naph), 7.77-7.73 (m, 1H, Naph), 7.57 (d, J=8.2 Hz, 1H, Naph), 7.43-4.41 (m, 3H, Naph), 7.31-7.29 (m, 1H, Naph), 6.99-6.33 (m, 4H, ArH), 4.12-4.04 (m, 1H, $CHCH_3$), 4.00-3.87 (m, 2H, $POCH_2$,), 3.83-3.72 (m, 1H,$CH_{2a}C(CH_3)_3$), 3.62-3.67 (m, 1H, $CH_{2b}C(CH_3)_3$), 3.26-3.17 (2H, m, $CH_2OH$), 2.49-2.45 (m, 2H, $CH_2C_7H_{15}$), 2.43-2.36 (m, 2H, $CH_2CH_2Ph$), 1.57-1.48 (m, 2H, $CH_2C_6H_{13}$), 1.46-1.30 (m, 5H, $CH_2CH_2Ph$ $CHCH_3$,), 1.30-1.14 (m, 10H, $C_5H_{10}CH_3$), 0.85-0.76 (m, 12H, $CH_3$, $C(CH_3)_3$). $^{31}P$ NMR ($CDCl_3$, 202 MHz) δ4.83, 4.62, 4.58, 4.39; $^{13}C$ NMR ($CDCl_3$, 125 MHz) δ173.64, 173.59, 146.49, 146.43, 140.46, 138.72, 138.67, 134.76, 128.42, 128.40, 128.39, 128.12, 128.08, 127.89, 127.86, 127.82, 125.64, 125.54, 125.48, 125.52, 125.14, 125.08, 121.61, 121.51, 121.48, 115.84, 115.71, 115.70, 115.55, 74.83, 68.82, 64.98, 50.48, 35.56, 31.92, 31.61, 31.43, 29.71, 29.51, 29.39, 29.29, 29.28, 28.51, 26.33, 26.28, 22.69, 22.69, 21.21, 21.19, 14.12; MS [ES+] m/z 655.80 [M+H]$^+$, HPLC r.t. 22.30, 22.80 min.

EXAMPLE 8

Synthesis of methyl 3-(((2-amino-2-(hydroxymethyl)-4-(4-octylphenyl)butoxy)(naphthalen-1-yloxy)phosphoryl)amino)propanoate (Prodrug A)

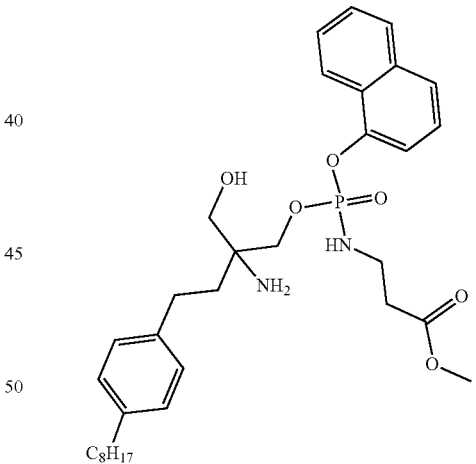

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Naphthyl-(methoxy-L-β-Alaninyl) phosphorochloridate 1 equivalent) in anhydrous THF (2 ml) was added dropwise to the stirring reaction mixture. The reaction was left to stir for 24 hours and then the solvent was removed in vacuo and the desired product was isolated in 33% yield (115 mg) as a mixture of four diastereoisomers using flash chromatography on a Biotage Isolera, eluting with $CH_3OH/CH_2Cl_2$ 0:100 v/v increasing to 10:90 v/v). ($R_f$=0.26, $CH_2Cl_2$/ $CH_3OH$ 95:5 v/v); Many signals overlap in $^1H$, $^{13}C$ spectra;

$C_{33}H_{47}N_2O_6P$, MW: 598.71; $^1$H NMR (CDCl$_3$, 500 MHz) δ8.06-8.02 (m, 1H, Naph), 7.75-7.74 (m, 1H, Naph), 7.57 (d, J=8.2 Hz, 1H, Naph), 7.45-7.38 (m, 3H, Naph), 7.31-7.29 (m, 1H, Naph), 7.00-6.91 (m, 4H, ArH), 3.98-3.79 (m, 2H, POCH$_2$), 3.54 (s, 3H, CH$_3$), 3.28-3.14 (m, 4H, CH$_2$OH, CH$_2$NH), 2.45-2.35 (m, 6H, CH$_2$CO, CH$_2$CH$_2$Ph, CH$_2$C$_7$H$_{13}$), 1.57-1.45(m, 2H, CH$_2$C$_6$H$_{13}$), 1.44-1.36 (m, 2H, CH$_2$CH$_2$Ph), 1.29-1.14 (m, 10H, 5× CH$_2$, C$_5$H$_{10}$CH$_3$), 0.80-0.78 (m, 3H, CH$_3$). $^{31}$P NMR (202 MHz, Chloroform-d) δ6.45, 6.20; $^{13}$C NMR (CDCl$_3$, 125 MHz) δ172.43, 146.55 (d, J$_{PH}$=7.5 Hz), 146.53 (d, J$_{PH}$=7.5 Hz), 140.49, 140.45, 138.95, 138.90, 134.76, 128.66, 128.42, 128.38, 128.13, 128.10, 127.90, 127.88, 125.65, 125.59, 125.54, 125.45, 125.59, 125.54, 125.07, 125.00, 121.52, 121.49, 115.67 (d, J$_{PC}$=2.5 Hz), 115.51, (d, J$_{PC}$=2.5 Hz), 69.43, 68.94, 65.35, 65.27, 55.88, 51.82, 37.44, 37.41, 36.08, 35.96, 35.73, 35.56, 31.92, 31.61, 29.51, 29.40, 29.29, 28.59, 28.56, 22.69, 14.13; MS [ES+] m/z 599.71 [M+H]$^+$, 621.7 [M+Na]$^+$.

EXAMPLE 9

Synthesis of (2R)-neopentyl-2-(((2-amino-2-(hydroxymethyl)-4-(4-octylphenyl)butoxy)((5,6,7,8-tetrahydronaphthalen-1-yl)oxy)phosphoryl)amino)propanoate

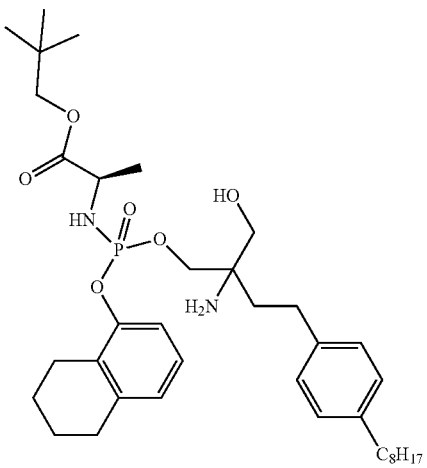

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time 5,6,7,8-tetrahydro-1-naphthyl-(neopenthyloxy-L-Alaninyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 21% yield (100 mg) as a mixture of four diastereoisomers using flash chromatography on a Biotage Isolera, eluting with CH$_3$OH/CH$_2$Cl$_2$ 0:100 v/v increasing to 10:90 v/v). (R$_f$=0.42, CH$_2$Cl$_2$/CH$_3$OH 95:5 v/v); Many signals overlap in $^1$H, $^{13}$C spectra; C$_{37}$H$_{59}$N$_2$O$_6$P; MW: 658.85; $^1$H NMR (CDCl$_3$, 500 MHz) δ7.78-7.05 (m, 7H, ArH), 4.33-3.94 (m, 1H, CHCH$_3$), 3.94-3.62(m, 4H, POCH$_2$, CH$_2$C(CH$_3$)$_3$), 3.45-3.08 (m, 2H, CH$_2$OH), 2.64-2.61 (4H, m, 2× CH$_2$ tetrahydronaph), 2.47-2.43 (m, 4H, CH$_2$CH$_2$Ph, CH$_2$C$_7$H$_{15}$), 1.73-1.43 (m, 6H, 2× CH$_2$ tetrahydronaph, CH$_2$C$_6$H$_{13}$), 1.38-1.31 (m, 2H, CH$_2$CH$_2$Ph) 1.28-1.09 (m, 10H, 5× CH$_2$, C$_5$H$_{10}$CH$_3$), 0.85, 0.84, 0.83, 0.83 (4s, 9H, C(CH$_3$)$_3$), 0.84-0.78 (m, 3H, CH$_3$); $^{31}$P NMR (CDCl$_3$, 202 MHz) δ4.62, 4.46, 4.23, 4.12; $^{13}$C NMR (CDCl$_3$, 125 MHz) δ173.79, 173.73, 173.68, 173.66, 173.62, 173.60, 148.76, 140.52, 140.51, 139.57, 139.54, 139.50, 138.97, 138.95, 138.87, 128.71, 128.67, 128.62, 128.43, 128.13, 128.10, 128.09, 117.13, 74.81, 65.36, 65.00, 50.48, 50.37, 36.10, 35.98, 35.56, 31.91, 31.60, 31.44, 29.50, 29.47, 29.37, 29.28, 28.61, 28.59, 26.35, 23.55, 23.49, 21.26, 21.22, 21.17, 21.12, 14.11; MS [ES+] m/z 659.4 [M+H]$^+$, HPLC r.t. 23.50, 24.70 min.

EXAMPLE 10

Synthesis of isopropyl-2-(((2-amino-2-(hydroxymethyl)-4-(4-octylphenyl)butoxy)(phenoxy)phosphoryl)amino)-2-methylpropanoate

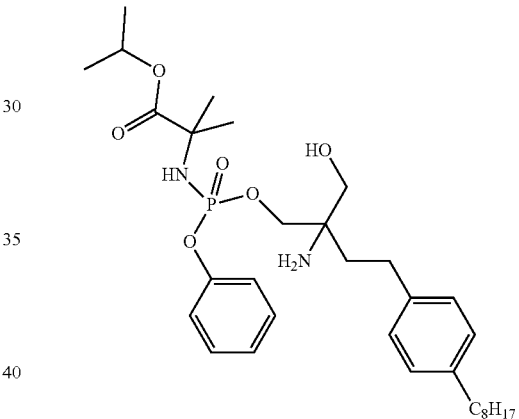

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time the Phenyl-(isopropoxy-dimethylglycinyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 24% yield (100 mg) as a mixture of four diastereoisomers using flash chromatography on a Biotage Isolera, eluting with CH$_3$OH/CH$_2$Cl$_2$ 0:100 v/v increasing to 10:90 v/v). (R$_f$=0.31, CH$_2$Cl$_2$/CH$_3$OH 95:5 v/v); C$_{32}$H$_{51}$N$_2$O$_6$P; M. W: 590.73; $^1$H NMR (CDCl$_3$, 500 MHz) δ7.26-7.22 (m, 2H, Ph), 7.16-7.13 (m, 2H, Ph), 7.10-7.07 (m, 1H, Ph), 7.01-6.95 (m, 2H, ArH), 4.97-4.91 (m, 1H, CH(CH$_3$)$_2$), 4.24 (t, J=9.1 Hz, OH), 4.03-3.79 (m, 2H, POCH$_2$), 3.43-3.17 (m, 2H, CH$_2$OH), 2.60-2.44 (m, 4H, CH$_2$CH$_2$Ph, CH$_2$C$_7$H$_{15}$), 1.62-1.42 (m, 10H, CH$_2$C$_6$H$_{13}$, CH$_2$CH$_2$Ph, C(CH$_3$)$_2$), 1.22-1.15 (m, 16H, 5× CH$_2$ C$_5$H$_{10}$CH$_3$, CH(CH$_3$)$_2$), 0.81-0.79 (m, 3H, CH$_3$); $^{31}$P NMR (CDCl$_3$, 202 MHz) δ3.37, 3.15; $^{13}$C NMR (CDCl$_3$, 125 MHz) δ174.95, 174.86, 174.78, 150.84, 150.78, 150.73, 140.51, 138.95, 138.91, 129.71, 129.67, 128.43, 128.16, 128.13, 125.10, 125.04, 120.54 (d, $J_{PC}$=5.0 Hz), 120.43(d, $J_{PC}$=5.0 Hz), 69.58, 69.57, 69.21, 69.16, 68.75, 68.71, 65.26, 65.13, 57.02, 57.01, 56.98, 56.97, 56.24, 56.19, 56.15, 56.11, 35.56, 31.90, 31.59, 29.49, 29.38, 29.27, 28.62, 27.04, 26.92, 26.87, 26.84, 26.76, 26.74, 26.71, 22.67, 21.60, 21.58; MS [ES+] m/z 591.72 [M+H]$^+$, HPLC r.t. 17.172 min.

EXAMPLE 11

Synthesis of (2R)-benzyl-2-(((2-amino-2-(hydroxymethyl)-4-(4-octylphenyl)butoxy)(naphthalen-1-yloxy)phosphoryl)amino) Propanoate

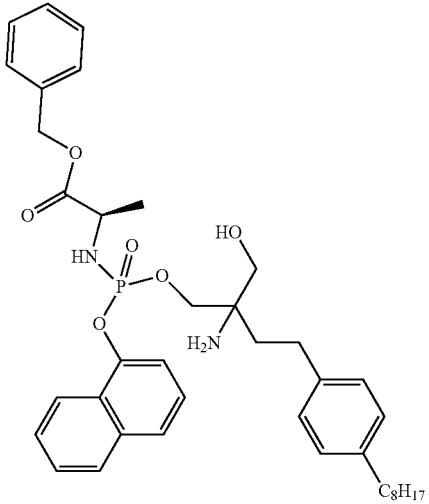

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Naphtyl-(benzyloxy-L-alanilyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 26% yield (128 mg) as a mixture of four diastereoisomers using flash chromatography on a Biotage Isolera, eluting with $CH_3OH/CH_2Cl_2$ 0:100 v/v increasing to 10:90 v/v). ($R_f$=0.41, $CH_2Cl_2$/$CH_3OH$ 95:5 v/v); $C_{39}H_{51}N_2O_6P$; M. Wt: 674.81; $^1$H NMR ($CDCl_3$, 500 MHz) δ8.05-7.99 (m, 1H, Naph), 7.75-7.72 (m, 1H, Naph), 7.56 (d, J=8.3 Hz, 1H, Naph), 7.42-7.47 (m, 3H, Naph), 7.30-7.18 (m, 6H, ArH), 6.99-6.94 (m, 2H, ArH), 6.82 (d, J=6.6 Hz, 1H, ArH), 5.08-4.92 (m, 2H, $CH_2Ph$), 4.10-3.75 (m, 3H, $CHCH_3$, $POCH_2$), 3.37-3.07 (m, 2H), 2.47 (td, J=7.5, 3.5 Hz, 3H), 2.51-2.34 (m, 4H, $CH_2CH_2Ph$, $CH_2C_7H_{15}$), 1.57-1.45 (m, 2H, $CH_2C_6H_{13}$), 1.42-1.29(m, 5H, $CH_2CH_2Ph$, $CHCH_3$), 1.22-1.18 (m, 10H, 5× $CH_2$, $CH_5H_{10}CH_3$), 0.80 (m, 1H 3H, $CH_3$); $^{31}$P NMR ($CDCl_3$, 202 MHz) δ4.71, 4.51, 4.47, 4.24; $^{13}$C NMR ($CDCl_3$, 125 MHz) δ173.42, 173.37, 146.40, 140.49, 140.48, 138.71, 138.64, 138.55, 135.64, 135.18, 135.15, 134.74, 134.61, 128.65, 128.59, 128.52, 128.50, 128.43, 128.39, 128.37, 128.29, 128.26, 128.18, 128.13, 128.10, 128.04, 127.90, 127.85, 127.52, 127.41, 125.64, 125.50, 125.03, 125.92, 125.51, 125.13, 125.08, 115.81, 115.78, 115.69, 115.66, 115.55, 115.52, 108.51, 67.34, 66.56, 64.69, 50.82, 50.62, 50.49, 50.46, 35.56, 31.92, 31.61, 29.52, 29.41, 29.30, 28.53, 22.69, 20.86, 20.82, 20.76, 14.13; MS [ES+] m/z 675.8 [M+H]$^+$, HPLC r.t. 17.172 min.

EXAMPLE 12

Synthesis of (2S)-ethyl-2-(((2-amino-2-(hydroxymethyl)-4-(4-octylphenyl)butoxy)(phenoxy)phosphoryl)amino)-4-(methylthio) Butanoate (Prodrug E)

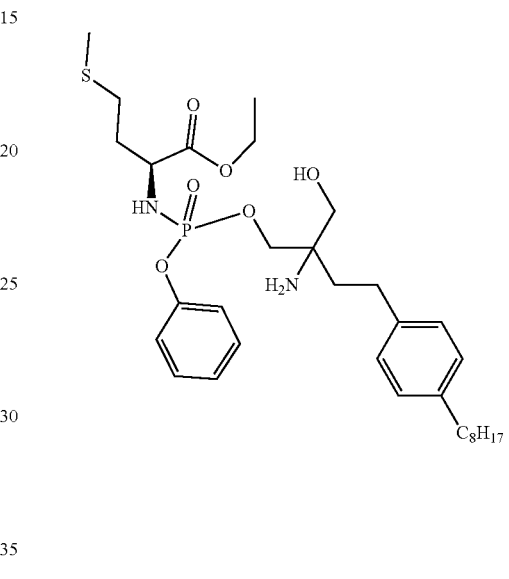

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Phenyl-(ethoxy-L-methionyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 37% yield (140 mg) as a mixture of four diastereoisomers using flash chromatography on a Biotage Isolera, eluting with $CH_3OH/CH_2Cl_2$ 0:100 v/v increasing to 10:90 v/v). ($R_f$=0.36, $CH_2Cl_2$/$CH_3OH$ 95:5 v/v); $C_{32}H_{51}N_2O_6PS$; M W: 622.80; $^1$H NMR ($CDCl_3$, 500 MHz) δ 7.25-7.21 (m, 2H, Ph), 7.17-7.13 (m, 2H, Ph), 7.09-7.04 (m, 1H, Ph), 7.10-6.96 (m, 4H, ArH), 4.16-3.78 (m, 5H, $POCH_2$, $OCH_2CH_3$, CHNH), 3.50-3.17 (m, 2H, $CH_2OH$), 2.56-2.33 (m, 6H, $CH_2CH_2Ph$, $CH_2C_7H_{15}$, $CH_2S$), 1.98-1.91 (m, 4H, $SCH_3$, $CH_{2a}CH_2S$), 1.87-1.69 (m, 1H, $CH_{2b}CH_2S$), 1.62-1.50 (m, 6H, $CH_2CH_2Ph$, $CH_2C_6H_{13}$,), 1.22-1.13(m, 13H, 5× $CH_2$, $C_5H_{10}CH_3$, $OCH_2CH_3$), 0.80 (m, 3H, $CH_3$). $^{31}$P NMR ($CDCl_3$, 202 MHz) δ4.56, 4.30, 4.24, 3.98; $^{13}$C NMR ($CDCl_3$, 125 MHz) δ 172.88, 172.84, 172.79, 172.78, 172.76, 172.74, 150.68, 150.61, 150.56, 140.51, 140.49, 138.99, 138.92, 129.77, 129.73, 128.43, 128.17, 128.15, 128.13, 125.25, 125.21, 125.16, 120.50, 120.46, 120.40, 120.38, 120.36, 120.34, 120.25, 120.21, 69.51, 69.46, 69.36, 69.31, 69.20, 69.16, 65.32, 65.17, 61.80, 61.77, 61.08, 61.03, 58.26, 56.00, 55.84, 53.79, 53.72, 53.52, 53.39, 36.11, 36.05, 35.56, 33.53, 33.48, 33.43, 31.90, 31.59, 29.75, 29.70, 29.65, 29.49, 29.38, 29.27, 28.63, 28.60, 22.67, 15.41, 15.32, 14.25, 14.18, 14.14, 14.11; MS [ES+] m/z 623.3 [M+H]$^+$

EXAMPLE 13

Synthesis of (2S)-methyl-2-(((2-amino-2-(hydroxymethyl)-4-(4-octylphenyl)butoxy)(phenoxy)phosphoryl)amino)-3-(4-(tert-butoxy)phenyl)propanoate

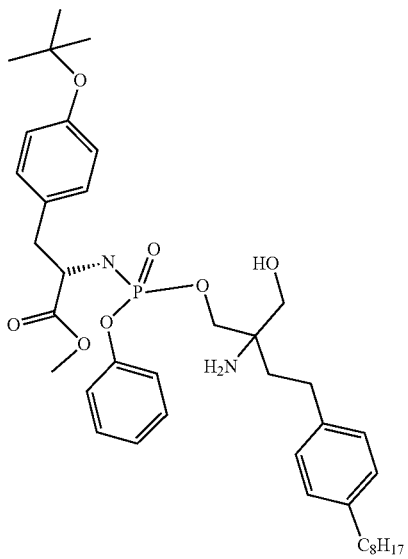

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Phenyl-(methoxy—O—tert-butyl-L-tyrosinyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 35% yield (150 mg) as a mixture of four diastereoisomers using flash chromatography on a Biotage Isolera, eluting with CH$_3$OH/CH$_2$Cl$_2$ 0:100 v/v increasing to 10:90 v/v). (R$_f$=0.32, CH$_2$Cl$_2$/CH$_3$OH 95:5 v/v); C$_{39}$H$_{57}$N$_2$O$_7$P; MW: 696.85; $^1$H NMR (CDCl$_3$, 500 MHz) δ7.22-7.17 (m, 2H, ArH), 7.06 (d, J=8.4 Hz, 1H, ArH), 7.01-6.86 (m, 7H, ArH), 6.82-6.79 (m, 2H, ArH), 4.14-3.98 (m, 1H, CHNH), 3.96-3.61 (m, 2H, POCH$_2$), 3.57, 3.53, 3.51, 3.50 (4s, 4H, OCH$_3$), 3.47-3.24 (m, 2H, CH$_2$OH), 2.92-2.87 (m, 2H, CHCH$_2$), 2.64-2.45 (m, 4H, CH$_2$CH$_2$Ph, CH$_2$C$_7$H$_{15}$), 1.74-1.64 (m, OH), 1.75-1.49 (m, 4H, CH$_2$CH$_2$Ph, CH$_2$C$_6$H$_{13}$), 1.32-1.11 (m, 19H, 5× CH$_2$, CH$_5$H$_{10}$CH$_3$, C(CH$_3$)$_3$), 0.81 (m, 3H, CH$_3$); $^{31}$P NMR (CDCl$_3$, 202 MHz) δ4.11, 3.89, 3.75, 3.11;

$^{13}$C NMR (CDCl$_3$, 125 MHz) δ173.01, 172.98, 172.93, 172.90, 172.56, 172.51, 154.57, 150.60, 150.54, 150.47, 140.89, 140.71, 140.64, 140.52, 138.82, 138.61, 138.28, 138.18, 130.55, 130.48, 130.40, 129.99, 129.95, 129.90, 129.72, 129.70, 129.47, 129.24, 128.64, 128.50, 128.43, 128.16, 128.13, 125.19, 125.16, 124.20, 124.16, 123.97, 120.55, 120.51, 120.45, 120.43, 120.41, 120.40, 120.35, 120.31, 115.55, 78.44, 75.20, 75.15, 74.95, 74.90, 69.04, 69.00, 68.75, 68.71, 68.58, 68.54, 65.37, 64.91, 64.82, 64.79, 64.63, 56.14, 55.83, 55.77, 55.43, 52.30, 51.66, 49.93, 49.89, 49.27, 39.83, 39.79, 39.77, 39.75, 39.72, 39.70, 36.71, 36.56, 35.72, 35.67, 35.57, 31.91, 31.59, 29.71, 29.50, 29.40, 29.28, 28.85, 28.62, 28.58, 22.68, 14.12; MS [ES+] m/z 697.3 [M+H]$^+$ m/z 697.80 [M+H]$^+$

EXAMPLE 14

Synthesis of (2R)-dimethyl-2-(((2-amino-2-(hydroxymethyl)-4-(4-octylphenyl)butoxy)(phenoxy)phosphoryl)amino)pentanedioate

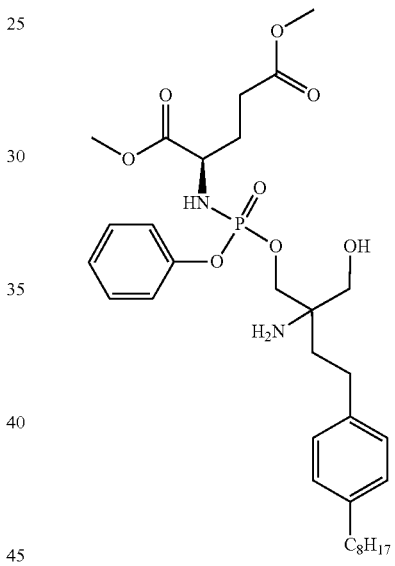

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Phenyl-(dimethoxy-L-glutamyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 39% yield (148 mg) as a mixture of four diastereoisomers using flash chromatography on a Biotage Isolera, eluting with CH$_3$OH/CH$_2$Cl$_2$ 0:100 v/v increasing to 10:90 v/v). (R$_f$=0.31 CH$_2$Cl$_2$/CH$_3$OH 95:5 v/v); C$_{32}$H$_{49}$N$_2$O$_8$P; M Wt: 620.71; $^1$H NMR (CDCl$_3$, 500 MHz) δ7.24-7.19 (m, 2H, Ph), 7.13-7.12 (m, 2H, Ph), 7.01-6.95 (m, 4H, ArH), 4.13-4.03 (m, 1H, CHNH), 4.00-3.83 (m, 3H, CHNH POCH$_2$), 3.64-3.53 (m, 6H, 2× CO$_2$CH$_3$), 3.48-3.20 (m, 2H, CH$_2$OH), 2.54-2.46 (m, 4H, CH$_2$CH$_2$Ph, CH$_2$C$_7$H$_{15}$), 2.41-2.23 (m, CH$_2$CH$_2$CH), 2.14-

1.78 (m, 2H, CH$_2$CH$_2$CH), 1.63-1.49 (m, 4H, CH$_2$CH$_2$Ph, CH$_2$C$_6$H$_{13}$), 1.22-1.18(m, 10H, 5× CH$_2$, CH$_5$H$_{10}$CH$_3$), 0.81 (m, 3H, CH$_3$); $^{31}$P NMR (CDCl$_3$, 202 MHz) δ4.34, 4.18, 4.08, 3.95; MS [ES+] m/z 621.30 [M+H]$^+$

EXAMPLE 15

Synthesis of (2S)-methyl-2-(((2-amino-2-(hydroxymethyl)-4-(4-octylphenyl)butoxy)(phenoxy)phosphoryl)amino)-3-(1H-indol-3-yl)propanoate (Prodrug B)

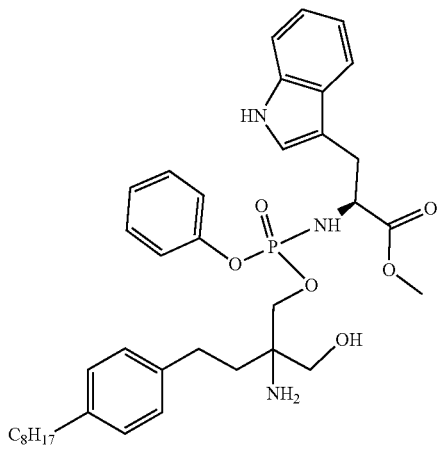

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Phenyl-(methoxy-L-trypthophanyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 29% yield (110 mg) as a mixture of four diastereoisomers using flash chromatography on a Biotage Isolera, eluting with CH$_3$OH/CH$_2$Cl$_2$ 0:100 v/v increasing to 10:90 v/v). (R$_f$=0.18, CH$_2$Cl$_2$/CH$_3$OH 95:5 v/v); C$_{37}$H$_{50}$N$_3$O$_6$P; M. W: 663.78; $^1$H NMR (CDCl$_3$, 500 MHz) δ8.49 (bs, 1H, NH), 7.46-7.40 (m, 1H, ArH), 7.24 (m, 2H, ArH), 7.1-6.88 (m, 1H, 10H), 4.28-4.16 (m, 1H, CHNH), 3.94-3.64 (m, 3H, CHNH, POCH$_2$), 3.27-3.01 (m, 4H, CH$_2$OH, CHCH$_2$), 3.57, 3.56, 3.55, 3.53 (4s, 3H, OCH$_3$), 2.51-2.38 (m, 4H, CH$_2$CH$_2$Ph, CH$_2$C$_7$H$_{15}$), 1.52-1.27 (m, 4H, CH$_2$CH$_2$Ph, CH$_2$C$_6$H$_{13}$), 1.22-1.14 (m, 10H, 2× CH$_2$, C$_5$H$_{10}$CH$_3$), 0.80 (t, J=6.8 Hz, 3H, CH$_3$); $^{31}$P NMR (CDCl$_3$, 202 MHz) δ4.43, 4.37, 4.19, 4.14; MS [ES+] m/z 664.5 [M+H]$^+$.

EXAMPLE 16

Synthesis of (2S,3R)-methyl-2-(((2-amino-2-(hydroxymethyl)-4-(4-octylphenyl)butoxy)(naphthalen-1-yloxy)phosphoryl)amino)-3-(tert-butoxy)butanoate

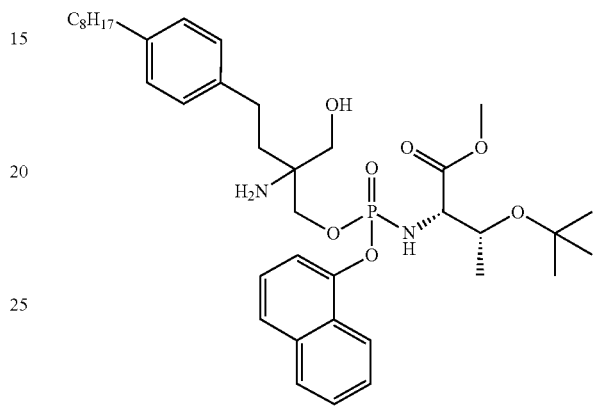

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time Naphthyl-(methoxy—O—tert-butyl-L-threoninyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 4% yield (160 mg) as a mixture of four diastereoisomers using flash chromatography on a Biotage Isolera, eluting with CH$_3$OH/CH$_2$Cl$_2$ 0:100 v/v increasing to 10:90 v/v). (R$_f$=0.30, CH$_2$Cl$_2$/CH$_3$OH 95:5 v/v); C$_{34}$H$_{55}$N$_2$O$_7$P; M W: 634.78; $^1$H NMR (CDCl$_3$, 500 MHz) δ7.35-7.31 (m, 2H, Ph), 7.18-7.154 (m, 2H, Ph), 7.01-7.06 (m, 4H, ArH), 4.16-4.12 (m, 1H, CHCH$_3$), 4.07-3.77 (m, 3H, CHNH POCH$_2$), 3.73-3.66 (m, 3H, OCH$_3$), 3.53-3.141 (m, 2H, CH$_2$OH), 2.72-2.55 (m, 4H, CH$_2$CH$_2$Ph, CH$_2$C$_7$H$_{15}$), 1.70-1.55 (m, 4H, CH$_2$CH$_2$Ph, CH$_2$C$_6$H$_{13}$), 1.31-1.25 (m, 10H, 5× CH$_2$, CH$_5$H$_{10}$CH$_3$), 1.21-1.16 (m, 3H, CHCH$_3$), 1.11-1.10 (m, 9H, C(CH$_3$)$_3$), 0.91-0.88 (m, 3H, CH$_3$); $^{31}$P NMR (CDCl$_3$, 202 MHz) δ5.45, 5.18, 4.93, 4.71; MS [ES+] m/z 635.37 [M+H]$^+$

EXAMPLE 17

Synthesis of (2R)-methyl-2-(((2-amino-2-(hydroxymethyl)-4-(4-octylphenyl)butoxy)(phenoxy)phosphoryl)amino)-6-((tert-butoxycarbonyl) amino)hexanoate (Prodrug C)

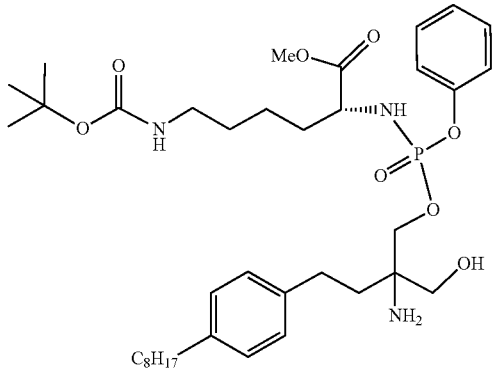

tBuMgCl (1 equivalent) was added dropwise to a solution of fingolimod hydrochloride (1 equivalent) in anhydrous THF (7 ml) under anhydrous conditions. The mixture was stirred at room temperature for one hour. After this time the Phenyl-(methoxy-N-Boc-L-lysinyl) phosphorochloridate (1 equivalent) in anhydrous THF (2 ml) was added dropwise to the stirring reaction mixture. The reaction was left to stir for 24 hours and then the solvent was removed in vacuo and the desired product was isolated in 39% yield (160 mg) as a mixture of four diastereoisomers using flash chromatography on a Biotage Isolera, eluting with $CH_3OH/CH_2Cl_2$ 0:100 v/v increasing to 10:90 v/v). ($R_f$=0.40, $CH_2Cl_2$/$CH_3OH$ 95:5 v/v); $C_{37}H_{60}N_3O_8P$; M. W: 705.86; $^1$H NMR ($CDCl_3$, 500 MHz) δ7.35-7.32 (m, 2H, Ph), 7.24-7.22 (m, 2H, Ph), 7.20-7.17 (m, 1H, Ph), 7.12-7.06 (m, 4H, ArH), 4.67-4.56 (m, 1H, CHNH), 4.06-4.95 (m, 4H, $CH_2NH$, $POCH_2$), 3.71, 3.69, 3.68 (3s, 3H, $OCH_3$), 3.61-3.42 (m, 2H, $CH_2OH$), 3.07-3.06 (m, 2H, $CH_2CH$), 2.64-2.56 (m, 4H, $CH_2CH_2Ph$, $CH_2C_7H_{15}$), 1.84-1.59 (m, 6H, $CH_2CH_2NH$, $CH_2CH_2Ph$, $CH_2C_6H_{13}$), 1.46 (s, 9H, $C(CH_3)_3$), 1.43-1.39 (m, 2H, $CH_2CH_2CH$), 1.32-1.24 (m, 10H, $C_5H_{10}CH_3$), 0.90 (t, J=6.8 Hz, 3H, $CH_3$); $^{31}$P NMR ($CDCl_3$, 202 MHz) δ4.56, 4.32, 4.06, 3.86; $^{13}$C NMR ($CDCl_3$, 125 MHz) δ173.67, 173.62, 173.45, 156.05, 150.61, 140.56, 138.91, 129.77, 129.74, 128.67, 128.52, 128.50, 128.44, 128.16, 128.13, 128.10, 128.09, 125.24, 125.20, 125.15, 120.50, 120.46, 120.43, 120.39, 120.37, 120.34, 69.24, 69.08, 65.36, 65.30, 58.41, 54.62, 54.40, 52.49, 50.79, 40.15, 40.08, 36.05, 33.88, 33.84, 33.78, 31.90, 31.60, 29.50, 29.38, 29.28, 28.63, 28.44, 22.68, 22.24, 22.20, 18.44, 14.11; MS [ES+] m/z 706.8 [M+H]$^+$

EXAMPLE 18

Synthesis of S-(2-(((2-amino-2-(hydroxymethyl)-4-(4-octylphenyl)butoxy)(phenoxy)phosphoryl)oxy)ethyl) 2,2-dimethylpropanethioate (SATE Prodrug)

A. Synthesis of 2,2-Dimethyl-thiopropionic acid S-(2-hydroxy-ethyl) Ester

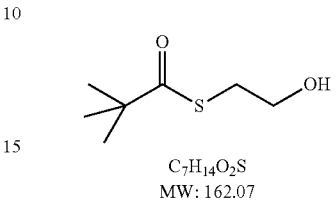

$C_7H_{14}O_2S$
MW: 162.07

Pivaloyl chloride (2.5 ml, 20.3 mmol) was added to a stirred solution of 2-mercaptoethanol (1.42 ml, 20.3 mmol) and triethylamine (2.83 ml, 20.3 mmol) in DCM, cooled at −78° C. The mixture was stirred at −78° C. for 1 h. After 1 h the mixture was extracted with water and DCM (3×20 ml). The combined organic extracts were dried over $MgSO_4$ and concentrated in vacuo. The oily residue was purified by flash column chromatography (eluting with hexane-ethyl acetate 80:20 v/v v/v increasing to 70:30 v/v) giving the desired compound (75%, 2.481 g). $^1$H NMR ($CDCl_3$, 500 MHz): δ3.98 (2H, m, $HOCH_2$), 3.03 (2H, m, $SCH_2$), 2.85 (1H, b, OH), 1.23 (9H, s, $CCH_3$).

B. Synthesis of 2,2-Dimethyl-thiopropionic acid S-[chloro-phenoxy-phosphoryloxy)-ethyl Ester

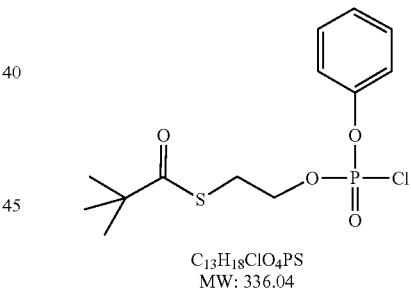

$C_{13}H_{18}ClO_4PS$
MW: 336.04

Dichloro phenyl phosphonate (2.29 ml, 15.31 mmol) was added dropwise into a cooled solution at −78° C. of 2,2-Dimethyl-thiopropionic acid S-(2-hydroxy-ethyl) ester (2.481 g, 15.31 mmol) and triethylamine (2.13 ml, 15.31 mmol) in THF (20 ml). The reaction was left to warm to room temperature and stirred overnight. The white precipitate was filtered off and the solution was concentrated in vacuo. The crude oil was used for the next step without further purification. $^{31}$P NMR ($CDCl_3$, 202 MHz): δ0.69. $^1$H NMR ($CDCl_3$, 500 MHz): δ7.31 (2H, m, ArH), 7.18 (3H, m, ArH), 4.24 (2H, m, $OCH_2$), 3.13 (2H, t, $SCH_2$), 1.17 (9H, s, $CCH_3$).

C. S-(2-(((2-amino-2-(hydroxymethyl)-4-(4-octylphenyl)butoxy)(phenoxy) phosphoryl)oxy)ethyl) 2,2-dimethylpropanethioate (SATE Prodrug)

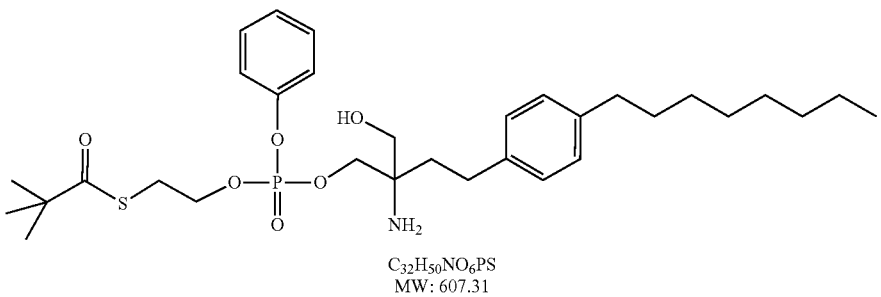 [SMILES: CCCCCCCCc1ccc(CCC(N)(CO)COP(=O)(OCCSC(=O)C(C)(C)C)Oc2ccccc2)cc1]

C₃₂H₅₀NO₆PS
MW: 607.31 tBuMgCl (1.45 ml, 1.454 mmol) was added dropwise to a solution of fingolimod HCl (500 mg, 1.454 mmol) in anhydrous THF (20 ml) under anhydrous conditions. The mixture was stirred at room temperature for one hour. After one hour 2,2-Dimethyl-thiopropionic acid S-[chloro-phenoxy-phosphoryloxy)-ethyl ester (489 mg, 1.454 mmol) in anhydrous THF (5 ml) was added dropwise to the stirring reaction mixture. The reaction was left to stir for 24 hours. After 24 hours the solvent was removed in vacuo and the desired product was isolated using flash chromatography (CH₃OH/CH₂Cl₂ 0:100 v/v increasing to 10:90 v/v) giving the desired compound as a mixture of four different diastereoisomers in 7% yield (0.076 g). C₃₂H₅₀N₂O₆PS; M. W: 607.31; ¹H NMR (CDCl₃, 500 MHz): δ7.17 (4H, m, ArH), 7.02 (4H, s, ArH), 6.98 (1H, m, ArH), 6.25 (2H, b, CNH₂) 3.95 (2H, q, SCH₂CH₂), 3.72 (4H, m, CCH₂O), 3.42 (1H, CH₂OH) 2.95 (2H, t, OCH₂CH₂), 2.55 (4H, m, ArCH₂), 1.89 (2H, m, CCH₂CH₂), 1.59 (2H, quin, CH₂CH₂CH₂), 1.31 (10H, m, CH₂CH₂CH₂), 1.16 (9H, s, CCH₃), 0.91 (3H, m, CH₂CH₃). ³¹P NMR (CDCl₃, 202 MHz): δ−5.88. ¹³C NMR (CDCl₃, 500 MHz): δ206.41, 152.38, 140.60, 137.89, 129.40, 128.43, 128.21, 123.52, 120.07, 64.98, 62.77, 60.81, 46.37, 35.60, 33.80, 31.94, 31.63, 29.72, 29.53, 29.48, 29.32, 28.74, 28.67, 28.61, 27.63, 27.31, 22.69, 14.13; MS [ES+] m/z 608.8 [M+H]⁺

Other compounds synthesized by methods analogous to those described above include:

pentyl (2S)-2-[({2-amino-3-hydroxy-2-[2-(4-octylphenyl)ethyl]propoxy}(4-methoxyphenoxy)phosphoryl)amino]propanoate:

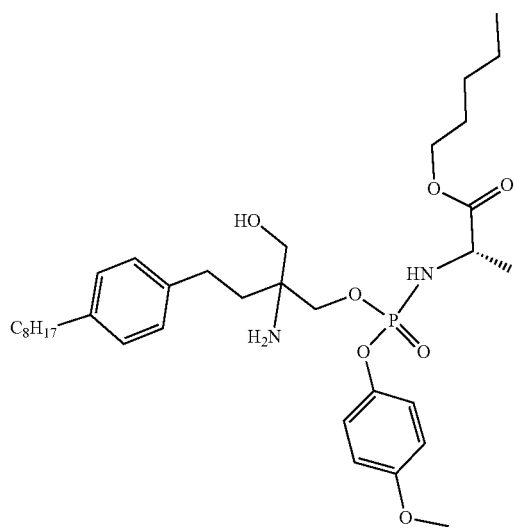

methyl 2-(((2-amino-2-(hydroxymethyl)-4-(4-octylphenyl)butoxy)(phenoxy) phosphoryl)amino)acetate:

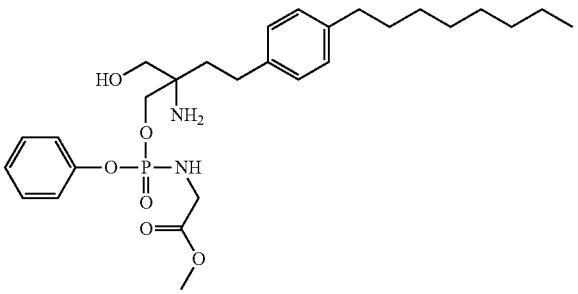 [SMILES: CCCCCCCCc1ccc(CCC(N)(CO)COP(=O)(NCC(=O)OC)Oc2ccccc2)cc1]

Ethyl 2-(((2-amino-2-(hydroxymethyl)-4-(4-octylphenyl)butoxy)(phenoxy) phosphoryl)amino)acetate:

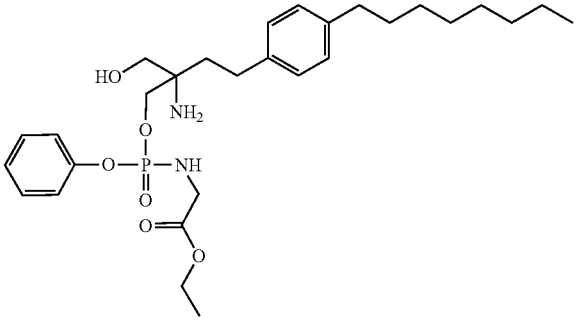 [SMILES: CCCCCCCCc1ccc(CCC(N)(CO)COP(=O)(NCC(=O)OCC)Oc2ccccc2)cc1]

(3S)-methyl 2-(((2-amino-2-(hydroxymethyl)-4-(4-octylphenyl)butoxy) (phenoxy)phosphoryl)amino)-3-methylpentanoate:

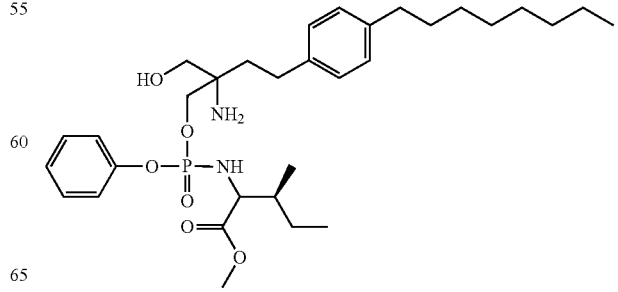

(2S) pentyl-2-(((2-amino-2-(hydroxymethyl)-4-(4-octylphenyl)butoxy) (phenoxy) phosphoryl)amino)-3-phenylpropanoate:

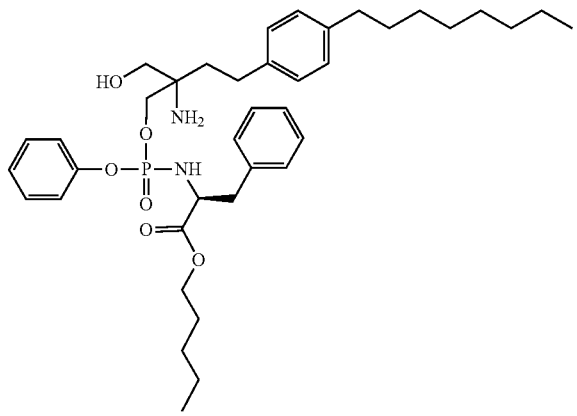 [SMILES: CCCCCCCCc1ccc(CCC(N)(CO)COP(=O)(N[C@@H](Cc2ccccc2)C(=O)OCCCCC)Oc2ccccc2)cc1]

EXAMPLE 19

Enzymatic Experiments on pentyl (2S)-2-[({2-amino-3-hydroxy-2-[2-(4-octylphenyl)ethyl]propoxy}(4-methoxyphenoxy) phosphoryl)amino]propanoate

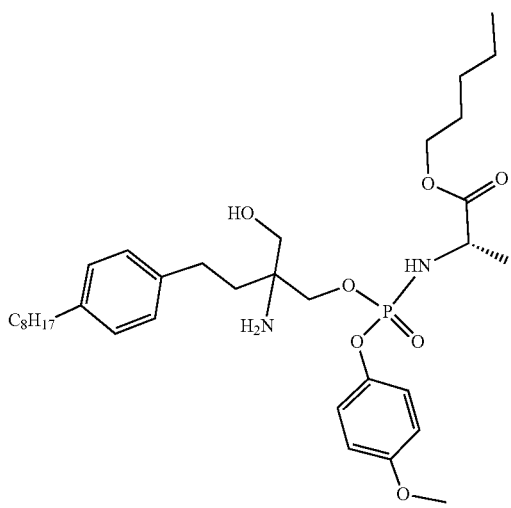

A. Carboxypeptidase Experiment

Blank in acetone d6 alone (No trizma): 1-2 mg of pentyl (2S)-2-[({2-amino-3-hydroxy-2-[2-(4-octylphenethyl] propoxy}(4-methoxyphenoxy) phosphoryl)amino]propanoate is dissolved in 150 μL of acetone d6 and the solution transferred into an NMR tube. The $^{31}$P spectrum is recorded (16 scans are sufficient).

The sample in the NMR tube is diluted with 100 μL of Trizma buffer (pH=7.6). 0.1 mg of Carboxypeptidase Y (Aldrich) is then dissolved in 150 μL of Trizma buffer and the resulting solution is added to the NMR tube. $^{31}$P NMR spectra are then recorded (512 scans, 600 sec delay, 20 experiments.) FIG. 1

B. Half-Life Determination

The half-life of the compound was also determined in the presence of Carboxypeptidase Y (see FIG. 2) and was found to be 2109 minutes.

C. Human Serum Stability

Blank in DMSO d6 alone (No trizma).
1-2 mg of pentyl (2S)-2-[({2-amino-3-hydroxy-2-[2-(4-octylpheny)ethyl] propoxy}(4-methoxyphenoxy)phosphoryl)amino]propanoate is dissolved in a mixture of 300 μL of DMSO d6 and 100 μL of Trizma buffer (pH=7.6). The solution is transferred into an NMR tube. The $^{31}$P spectrum is recorded (64 scans).

To the blank sample in the NMR tube 150 μL of stock solution of cell lysate are added and then $^{31}$P spectra are recorded (512 scans, 600 sec delay). The results of the above experiment are shown in FIG. 3 and confirm that pentyl (2S)-2-[({2-amino-3-hydroxy-2-[2-(4-octylphenyl)ethyl] propoxy}(4-methoxyphenoxy)phosphoryl)amino]propanoate is stable in human serum.

D. B95a Cell Lysate Experiment 4 mg of pentyl (2S)-2-[({2-amino-3-hydroxy-2-[2-(4-octylpheny)ethyl]propoxy}(4-methoxyphenoxy)phosphoryl) amino]propanoate are dissolved in a mixture of 150 μL of acetone d6 and 100 μL of trizma buffer (pH=7.6). The solution is transferred into an NMR tube. The $^{31}$P spectrum is recorded (64 scans).

To the blank sample in the NMR tube 150 μL of B95a cell lysate (6.000.000 cell/m L) are added and then $^{31}$P spectra are recorded at 37 Celsius (512 scans, 600 sec delay, 20 experiments).

The overlaid $^{31}$P spectra are shown in FIG. 4, which makes it clear that the compound is processed to release the active monophosphorylated analogue. FIG. 5 shows the half-life of the parent compound.

The results of the above experiment confirm that in B95a cell lysate pentyl (2S)-2-[({2-amino-3-hydroxy-2-[2-(4-octylphenyl)ethyl]propoxy}(4-methoxyphenoxy)phosphoryl) amino]propanoate is processed with a half-life of 664 minutes.

EXAMPLE 20

Effects of FINGOLIMOD PRODRUGS on Npc1$^{-/-}$ fibroblasts (FIG. 6)

Cell Culture

Glia (mouse astrocytes) were primary cells cultured by Dr E Lloyd-Evans from wild-type (Npc1$^{+/+}$) and NPC1-null (Npc1$^{-/-}$) mice. Wild-type (NPC1$^{+/+}$) and NPC1-null (NPC1$^{-/-}$) human fibroblasts were obtained from the coriell cell bank. All cells were grown as monolayers in a humidified incubator at 37° C. and 5% $CO_2$ in complete Dulbecco's Modified Eagle's medium (DMEM). Flask's were used for maintenance and chamber slides (ibidi) and 24-well plates (Greiner) were used for cell treatments.

Cholesterol Staining Using Filipin

Cholesterol was visualized using filipin (filipin complex from Streptomyces filipinenses), a naturally fluorescent antibiotic that specifically binds cholesterol [ref]. PFA-fixed glia were incubated in complete DMEM with 187.5 µg/ml filipin at room temperature for 30 minutes, then washed 3 times in PBS (FIG. 6a).

Lysotracker Staining for Lysosomes

Human fibroblasts grown in ibidi chamberslides were washed once in complete Hank's Balanced Salt Solution (HBSS+1 mM HEPES pH7.2, 1 mM $CaCl_2$, 1 mM $MgCl_2$) prior to incubation with Lysotracker green (Invitrogen, 200 nM in HBSS), which loads specifically into lysosomes, for 10 minutes at room temperature. Cells were then washed twice in complete HBSS and imaged live (FIG. 6b).

The invention claimed is:

1. A compound of general formula (I) including all stereoisomers thereof and all isotopic variants thereof:

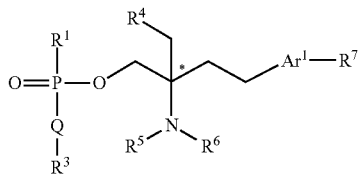

(I)

wherein $R^1$ is —$OAr^2$ or -$Q'R^{3'}$;
  wherein $Ar^2$ is a $C_{6-10}$ aryl or a 5-10 membered heteroaryl group optionally substituted with one or more substituents selected from OH, halo, nitro, $C_{1-6}$ alkyl, $C_{1-6}$ haloalkyl, —O($C_{1-6}$ alkyl), —O($C_{1-6}$ haloalkyl), $NH_2$, $NH(C_{1-6}$ alkyl), $N(C_{1-6}$ alkyl$)_2$ or $SF_5$;
Q and Q' are each independently O, S or $NR^2$;
$R^2$ is H or $C_{1-6}$ alkyl optionally substituted by one or more halo, OH or phenyl substituents;
$R^3$ and $R^{3'}$ are each independently $C_{1-10}$ alkyl or $C_{1-10}$ alkyl—C(O)$OR^{11}$, either of which is optionally substituted by one or more substituents $R^{12}$;
$R^{11}$ is $C_{1-6}$ alkyl, $C_{1-6}$ haloalkyl or benzyl;
$R^{12}$ is —O—$R^{13}$, —$SR^{13}$, Z, —Z—O—$R^{13}$, —O—Z—$R^{13}$, —Z—$R^{13}$, —C(O)$R^{13}$, —C(O)$OR^{13}$, $NR^{13}R^{14}$, C(O)$NR^{13}R^{14}$, —NHC(O)$R^{13}$, —NHC(O)$OR^{13}$, NH(C=NH)$NR^{13}R^{14}$, —OC(O)—$R^{13}$, —SC(O)$R^{13}$ or —S—S—$R^{13}$;
$R^{13}$ and $R^{14}$ are each independently H or $C_{1-6}$ alkyl;
Z is a $C_{6-10}$ aryl or a 5- to 10-membered heteroaryl group optionally substituted with one or more substituent selected from halo or OH;
or when Q or Q' is $NR^2$, $R^2$ and $R^3$ or $R^2$ and $R^{3'}$ together with the nitrogen atom to which they are attached, form a 5- or 6-membered heterocyclic ring substituted with C(O)$OR^{11}$, wherein $R^{11}$ is as defined above;
$R^4$ is OH or a group:

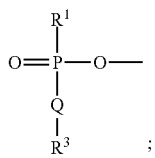

;

where $R^1$, Q and $R^3$ are as defined above;
each of $R^5$ and $R^6$ is independently selected from hydrogen or $C_{1-4}$ alkyl; or $R^5$ and $R^6$ together with the nitrogen atom to which they are attached may form a 5- or 6-membered heterocyclic ring optionally containing a further heteroatom selected from N, O or S;
$Ar^1$ is a phenyl or a 5- or 6-membered heteroaryl group, either of which is optionally substituted with one or more substituents selected from halo, OH, $C_{1-4}$ alkyl or $C_{1-4}$ haloalkyl; and
$R^7$ is $C_{1-10}$ alkyl optionally substituted with phenyl or a 5- or 6-membered heteroaryl group, wherein the phenyl or heteroaryl groups are optionally substituted with one or more substituents selected from halo, $NO_2$, OH, $C_{1-4}$ alkyl, $C_{1-4}$ haloalkyl, O($C_{1-4}$ alkyl) or phenyl optionally substituted with halo, OH, $C_{1-4}$ alkyl, $C_{1-4}$ haloalkyl or O($C_{1-4}$ alkyl) and optionally labelled with a fluorescent, visible or isotopic detectable label;
or a pharmaceutically or veterinarily acceptable salt or hydrate thereof.

2. A compound according to claim 1 wherein the asymmetric carbon atom (*) to which the $NR^5R^6$, $CH_2R^4$, —$CH_2CH_2$—$Ar^1$—$R^7$ and the phosphate moiety:

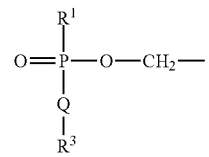

are attached is in the S-orientation.

3. A compound according to claim 1 wherein $R^1$ is $OAr^2$.

4. A compound according to claim 3 wherein $Ar^2$ is phenyl, naphthyl, or tetrahydronaphthyl, any of which is optionally substituted with one or more substituents as defined in claim 1.

5. A compound according to claim 1 wherein $R^1$ is -$Q'R^{3'}$.

6. A compound according to claim 1 wherein Q and/or Q' (when present) is $NR^2$ where $R^2$ is H or $C_{1-4}$ alkyl optionally substituted with one or more halo, OH or phenyl substituents.

7. A compound according to claim 1 wherein $R^3$ and/or $R^{3'}$ (when present) is a group $C_{1-10}$ alkyl—C(O)$OR^{11}$.

8. A compound according to claim 7 wherein $R^3$ and/or $R^{3'}$ (when present) is —C($R^{12a}R^{12b}$)C(O)$OR^{11}$ or —C($R^{12a}R^{12b}$)$CH_2$C(O)$OR^{11}$;
  wherein $R^{11}$ is as defined above;
  $R^{12a}$ is H or $C_{1-6}$ alkyl optionally substituted by a group $R^{12}$ as defined above; and
  $R^{12b}$ is $C_{1-4}$ alkyl or H.

9. A compound according to claim 8 wherein $R^{12a}$ is a side chain of a naturally-occurring amino acid selected from alanine, valine, leucine, isoleucine, methionine, phenylalanine, tyrosine, tryptophan, arginine, histidine, lysine, aspartic acid, glutamic acid, serine, threonine, asparagine, glutamine, cysteine or glycine or a non-natural amino acid.

10. A compound according to claim 8 wherein $R^{12b}$ is H, methyl or ethyl.

11. A compound according to claim 9 wherein the $R^{12a}$ side chain is modified such that OH and/or SH groups are replaced with O—$C_{1-6}$ alkyl or S—$C_{1-6}$ alkyl and/or carboxylic acid groups are esterified as a $C_{1-6}$ alkyl or benzyl ester.

12. A compound according to claim 1 wherein Q is $NR^2$, and $R^2$ and $R^3$ together with the nitrogen atom to which they are attached, form a pyrrolidin-1-yl ring substituted at the 2-position with C(O)OR$^{11}$, wherein R$^{11}$ is as defined in claim 1; and/or wherein R$^1$ is Q'R$^{3'}$, Q' is NR$^2$, and R$^2$ and R$^{3'}$ together with the nitrogen atom to which they are attached, form a pyrrolidin-1-yl ring substituted at the 2-position with C(O)OR$^{11}$, wherein R$^{11}$ is as defined in claim 1.

13. A compound according to claim 1 wherein Q is O or S and R$^3$ is C$_{1-10}$ alkyl substituted with, —OC(O)—R$^{13}$, —SC(O)R$^{13}$ or —S—S—R$^{13}$, where R$^{13}$ is H or C$_{1-6}$ alkyl; and/or wherein R$^1$ is Q'R$^{3'}$, Q' is O or S and R$^{3'}$ is C$_{1-10}$ alkyl substituted with, —OC(O)—R$^{13}$, —SC(O)R$^{13}$ or —S—S—R$^{13}$, where R$^{13}$ is H or C$_{1-6}$ alkyl.

14. A compound according to claim 1 wherein at least one of R$^5$ and R$^6$ is H.

15. A compound according to claim 1 wherein, independently or in any combination:
R$^4$ is OH;
R$^5$ is H;
R$^6$ is H;
R$^1$ is —OAr$^2$ and —Ar$^2$ is phenyl;
Ar$^1$ is phenyl and the R$^7$ moiety is positioned at the 4-position of the phenyl ring with respect to the —CH$_2$CH$_2$—linker group;
R$^7$ is C$_{6-10}$ alkyl or C$_{3-5}$ alkyl substituted with (C$_{1-2}$ alkyl) phenyl;
the C* centre has S stereochemistry; and
a moiety —O—CH$_2$—C(CH$_2$R$^4$)(NR$^5$R$^6$)—CH$_2$CH$_2$—Ar$^1$—R$^7$ that is

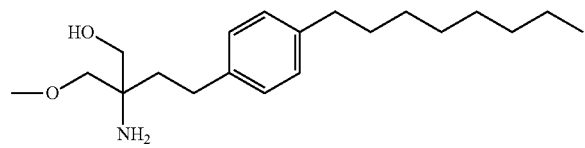 [SMILES: CCCCCCCCc1ccc(CCC(N)(CO)COC)cc1]

or an S enantiomer thereof:

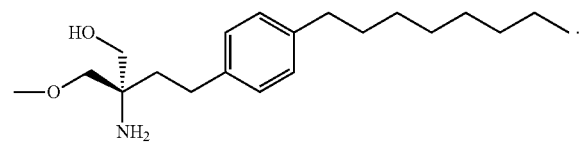 [SMILES: CCCCCCCCc1ccc(CC[C@](N)(CO)COC)cc1]

16. A compound according to claim 1 selected from the group consisting of:
(2S)-methyl 2-(((2-amino-2-(hydroxymethyl)-4-(4-octylphenyl)butoxy)(phenoxy)phosphoryl)amino)propanoate;
benzyl 2-(((2-amino-2(hydroxymethyl)-4-(4-octylphenyl)butoxy)(phenoxy) phosphoryl)amino)acetate;
(2S) benzyl-2-(((2-amino-2-(hydroxymethyl)-4-(4-octylphenyl)butoxy) (phenoxy)phosphoryl)amino)-4-methylpentanoate;
(2S) benzyl-1-((2-amino-2-(hydroxymethyl)-4-(4-octylphenyl)butoxy) (phenoxy)phosphoryl)pyrrolidine-2-carboxylate;
(2S) ethyl-2-(((2-amino-2-(hydroxymethyl)-4-(4-octylphenyl)butoxy)(phenoxy) phosphoryl)amino)-propanoate;
(2R)-benzyl 2-(((2-amino-2-(hydroxymethyl)-4-(4-octylphenyl)butoxy) (naphthalen-1-yloxy)phosphoryl) amino)propanoate;
(2R)-neopentyl 2-(((2-amino-2-(hydroxymethyl)-4-(4-octylphenyl)butoxy) (naphthalen-1-yloxy)phosphoryl) amino) propanoate;
methyl 3-(((2-amino-2-(hydroxymethyl)-4-(4-octylphenyl)butoxy)(naphthalen-1-yloxy)phosphoryl)amino) propanoate;
(2R)-neopentyl-2-(((2-amino-2-(hydroxymethyl)-4-(4-octylphenyl)butoxy) ((5,6,7,8-tetrahydronaphthalen-1-yl)oxy)phosphoryl) amino)propanoate;
isopropyl-2-(((2-amino-2-(hydroxymethyl)-4-(4-octylphenyl)butoxy) (phenoxy)phosphoryl)amino)-2-methylpropanoate;
(2R)-benzyl-2-(((2-amino-2-(hydroxymethyl)-4-(4-octylphenyl)butoxy) (naphthalen-1-yloxy)phosphoryl) amino)propanoate;
(2S)-ethyl-2-(((2-amino-2-(hydroxymethyl)-4-(4-octylphenyl)butoxy) (phenoxy)phosphoryl)amino)-4-(methylthio) butanoate;
(2S)-methyl-2-(((2-amino-2-(hydroxymethyl)-4-(4-octylphenyl)butoxy) (phenoxy)phosphoryl)amino)-3-(4-(tert-butoxy)phenyl)propanoate;
(2R)-dimethyl-2-(((2-amino-2-(hydroxymethyl)-4-(4-octylphenyl)butoxy) (phenoxy)phosphoryl)amino)pentanedioate;
(2S)-methyl-2-(((2-amino-2-(hydroxymethyl)-4-(4-octylphenyl)butoxy) (phenoxy)phosphoryl)amino)-3-(1H-indol-3-yl)propanoate;
(2S,3R)-methyl-2-(((2-amino-2-(hydroxymethyl)-4-(4-octylphenyl)butoxy) (naphthalen-1-yloxy)phosphoryl) amino)-3-(tert-butoxy)butanoate;
(2R)-methyl-2-(((2-amino-2-(hydroxymethyl)-4-(4-octylphenyl)butoxy) (phenoxy)phosphoryl)amino)-6-((tert-butoxycarbonyl) amino)hexanoate;
S-(2-(((2-amino-2-(hydroxymethyl)-4-(4-octylphenyl) butoxy)(phenoxy) phosphoryl)oxy)ethyl) 2,2-dimethylpropanethioate;
pentyl (2S)-2-[({2-amino-3-hydroxy-2-[2-(4-octylphenyl)ethyl]propoxy}(4-methoxyphenoxy)phosphoryl) amino]propanoate;
methyl 2-(((2-amino-2-(hydroxymethyl)-4-(4-octylphenyl)butoxy)(phenoxy) phosphoryl)amino)acetate;
ethyl 2-(((2-amino-2-(hydroxymethyl)-4-(4-octylphenyl) butoxy)(phenoxy) phosphoryl)amino)acetate;
(3S)-methyl 2-(((2-amino-2-(hydroxymethyl)-4-(4-octylphenyl)butoxy) (phenoxy)phosphoryl)amino)-3-methylpentanoate;
(2S) pentyl-2-(((2-amino-2-(hydroxymethyl)-4-(4-octylphenyl)butoxy) (phenoxy)phosphoryl)amino)-3-phenylpropanoate;
and their pharmaceutically acceptable salts, hydrates, and stereoisomers.

17. A process for the preparation of a compound according to claim 1 comprising:
i. for compounds of general formula (I) in which R$^5$ and R$^6$ are both H:
reacting an analogue of the compound of general formula (I) in which one of R$^5$ and R$^6$ is replaced with —C(O)OR$^{15}$, wherein R$^{15}$ is C$_{1-6}$ alkyl or C$_{6-14}$ aryl optionally substituted with one or more substituents selected from C$_{1-6}$ alkyl, C$_{1-6}$ haloalkyl or halo;
to remove the protecting group; or
ii. for all compounds of general formula (I): reacting a compound of general formula (II):

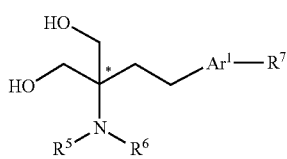

(II)

wherein $R^5$, $R^6$, $Ar^1$ and $R^7$ are as defined for general formula (I);
with a compound of general formula (III):

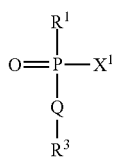

(III)

wherein:
Q, $R^1$ and $R^3$ are as defined for general formula (I); and
$X^1$ is halo;
wherein the compound of general formula (II) may firstly be reacted with a hindered base, following which the product is reacted with the compound of general formula (III).

18. A method for the treatment of lysosomal storage disorders selected from the group consisting of: Niemann-Pick type C1, Niemann-Pick type C2, Niemann-Pick types A and B, neuronal ceroid lipofuscinoses (NCL), mucolipidoses, lipidoses and sphingolipidoses, Gaucher disease, Fabry disease, Tay-Sachs disease, defective autophagy, accumulation of free cholesterol and endocytic transport defects, mycobacterial diseases, tuberculosis and BCG, the method comprising administering to a patient in need of such treatment an effective amount of a compound according to claim 1.

19. A pharmaceutical composition comprising a compound according to claim 1 and a pharmaceutically acceptable excipient or carrier.

20. A pharmaceutical composition according to claim 19 which is formulated for oral administration.

21. The compound according to claim 15 wherein the moiety —O—$CH_2$—C($CH_2R^4$)($NR^5R^6$)—$CH_2CH_2$—$Ar^1$—$R^7$ is the S enantiomer:

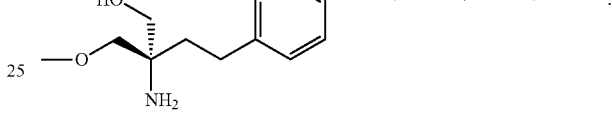

* * * * *

UNITED STATES PATENT AND TRADEMARK OFFICE
CERTIFICATE OF CORRECTION

PATENT NO. : 11,078,221 B2
APPLICATION NO. : 16/651058
DATED : August 3, 2021
INVENTOR(S) : Emyr Lloyd-Evans et al.

It is certified that error appears in the above-identified patent and that said Letters Patent is hereby corrected as shown below:

In the Claims

Claim 15, Column 47, Line 31, replace:

" 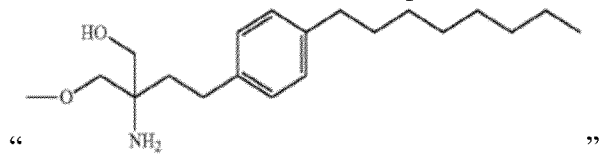 "

With:

" 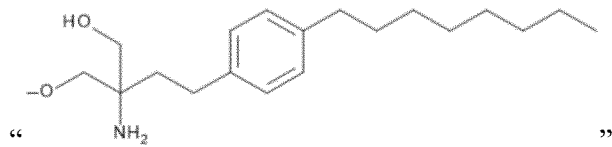 "

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*